(12) United States Patent
Wu et al.

(10) Patent No.: US 9,401,636 B2
(45) Date of Patent: Jul. 26, 2016

(54) MULTI-FUNCTION POWER REGULATOR FOR PRIORITIZING FUNCTIONS AND ALLOCATING RESOURCES THEREOF

(71) Applicant: Gridco Inc., Woburn, MA (US)

(72) Inventors: Jia Wu, Andover, MA (US); Darrell Furlong, Hollis, NH (US); Jing Huang, Andover, MA (US); James Simonelli, Grafton, MA (US)

(73) Assignee: Gridco Inc., Woburn, MA (US)

( * ) Notice: Subject to any disclaimer, the term of this patent is extended or adjusted under 35 U.S.C. 154(b) by 300 days.

(21) Appl. No.: 14/288,943

(22) Filed: May 28, 2014

(65) Prior Publication Data
US 2015/0349629 A1    Dec. 3, 2015

(51) Int. Cl.
*H02M 3/158* (2006.01)
*H02M 3/04* (2006.01)
(Continued)

(52) U.S. Cl.
CPC .......... *H02M 3/04* (2013.01); *G06Q 10/04* (2013.01); *G06Q 50/06* (2013.01); *H02J 3/18* (2013.01);
(Continued)

(58) Field of Classification Search
CPC ..... H02M 3/04; H02M 3/158; H02M 3/1588; H02M 2001/0003; H02M 1/4208; H02M 1/00; H02M 1/12; H02M 1/42; H02J 3/18
USPC ............. 323/205–211, 220–223, 299, 301; 363/34, 37, 40
See application file for complete search history.

(56) References Cited

U.S. PATENT DOCUMENTS

| 5,469,044 A | 11/1995 | Gyugyi et al. |
| 5,734,257 A | 3/1998 | Schauder et al. |

(Continued)

FOREIGN PATENT DOCUMENTS

CN    2138857    7/1993

OTHER PUBLICATIONS

Written Opinion of the International Searching Authority for PCT Application No. PCT/US2015/29679 mailed Aug. 13, 2015 (eight (8) pages).

(Continued)

*Primary Examiner* — Yemane Mehari
(74) *Attorney, Agent, or Firm* — Iandiorio Teska & Coleman, LLP

(57) ABSTRACT

A multi-function power regulator for prioritizing functions and allocating resources thereof, the multi-function regulator including a plurality of resources each having a resource capacity limit. The multi-function regulator also includes a shunt converter is configured to perform one or more shunt converter functions while consuming one or more of the resources, a series converter is configured to perform one or more series converter functions while consuming one or more of the resources. A control engine coupled to the shunt converter, the series converter, and a plurality of sensors, the control engine is configured to monitor and control the one or more shunt converter functions and the one or more series converter functions. The multi-function regulator also includes a priority control engine coupled to the control engine, the priority control engine is configured to set a priority order for performing the one or more shunt converter functions and/or the one or more series converter functions and configured to determine whether one or more resource capacity limits has been exceeded or not exceeded by the shunt converter functions and/or the series converter function and in response to one or more exceeded resource capacity limits adjust the operation of the shunt converter functions and/or the series converter based on the priority order such that the one or more resource capacity limits exceeded is no longer exceeded.

39 Claims, 18 Drawing Sheets

(51) Int. Cl.

| | | |
|---|---|---|
| *H02M 1/00* | (2006.01) | |
| *H02M 1/12* | (2006.01) | |
| *H02M 1/42* | (2007.01) | |
| *H02J 3/18* | (2006.01) | |
| *H02J 9/06* | (2006.01) | |
| *G06Q 10/04* | (2012.01) | |
| *G06Q 50/06* | (2012.01) | |

(52) U.S. Cl.
CPC .............. *H02J 3/1814* (2013.01); *H02J 9/061* (2013.01); *H02M 1/00* (2013.01); *H02M 1/12* (2013.01); *H02M 1/4208* (2013.01); *H02M 2001/0003* (2013.01)

(56) References Cited

U.S. PATENT DOCUMENTS

| | | | |
|---|---|---|---|
| 5,818,126 A | 10/1998 | Mohan | |
| 5,889,668 A | 3/1999 | Schauder et al. | |
| 5,909,105 A | 6/1999 | Noroozian | |
| 6,282,104 B1* | 8/2001 | Kern | H02M 1/12 363/34 |
| 6,335,613 B1 | 1/2002 | Sen et al. | |
| 6,862,201 B2 | 3/2005 | Hodge, Jr. | |
| 6,963,187 B2 | 11/2005 | Bebic et al. | |
| 7,117,070 B2 | 10/2006 | Chow et al. | |
| 7,177,727 B2 | 2/2007 | Chu et al. | |
| 7,860,615 B2 | 12/2010 | Nelson et al. | |
| 2002/0136036 A1 | 9/2002 | Hugget et al. | |
| 2005/0071050 A1 | 3/2005 | Chow et al. | |
| 2006/0110566 A1 | 5/2006 | Wada et al. | |
| 2006/0244570 A1* | 11/2006 | Leung | H02J 1/08 363/72 |
| 2009/0200994 A1 | 8/2009 | Fornage | |
| 2010/0315840 A1 | 12/2010 | Cohen | |
| 2012/0097656 A1* | 4/2012 | Peters | B23K 9/091 219/130.51 |
| 2012/0200279 A1* | 8/2012 | Pamulaparthy | H02J 3/1807 323/301 |
| 2013/0169214 A1* | 7/2013 | Tseng | H02J 7/00 320/107 |
| 2013/0308356 A1* | 11/2013 | Subramanium | H02J 5/00 363/53 |
| 2014/0009980 A1 | 1/2014 | Divan et al. | |

OTHER PUBLICATIONS

Ojo et al., Control of A Center-Node Unified Power Flow Controller in Transmission Line Applications, 2001, pp. 545-554.

Liu et al., Strategies for Handling UPFC Constraints in Steady-State Power Flow and Voltage Control, vol. 15 No. 2, May 2000, pp. 566-571.

* cited by examiner

MULTI-FUNCTION POWER REGULATOR FOR PRIORITIZING FUNCTIONS AND ALLOCATING RESOURCES THEREOF

FIELD OF THE INVENTION

This invention relates to a multi-function power regulator for prioritizing functions and allocating resources thereof.

COMPUTER PROGRAM LISTING APPENDIX

A computer program listing appendix is filed herewith on compact disk. The material on the compact disk is hereby incorporated by reference. Two identical compact disks have been submitted. Each compact disk contains one file entitled source code.txt. The two disks were created on Jun. 9, 2016.

BACKGROUND OF THE INVENTION

Power conversion devices are typically built to perform prescribed functionality and set to perform the functions up to specified limits of the device. A simple example of a power conversion is the DC to AC power transfer of an inverter. The inverter is designed to efficiently convert power from a DC source to an AC form. The various components of power conversion devices have limits as to how far they can be stressed. The stresses may include thermal, voltage, current, physical, and the like. For the inverter to ensure it will not be damaged, monitoring and control methods are often utilized to report how close the inverter is to hitting these limits and, if reached, to ensure the inverter can protect itself from damage by shutting down, limiting current, changing modes, or any number of other self-limiting means. Inverters may also limit the amount of AC current they can produce to ensure this maximum capacity limit is never exceeded.

In more complex devices, such as an uninterruptable power supply (UPS), there may be more than one type of function required and therefore multiple capacity limits to report and measure. For a UPS, one dimension may be the amount of power being processed from the system, while another dimension may be the amount of battery run time available given the current loading and state of charge for its battery system.

A common requirement for the systems discussed above is to define the resource capacity dimensions and to report on how much of that capacity is being utilized, or, inversely how much capacity is available. In some instances, capacity limits can be prioritized to ensure the customer received the performance relevant to their needs. For example, a customer of a UPS may always want 10 minutes of runtime when batteries are fully charged, e.g., a run time priority. In this example, the UPS may alarm below its 100% load capacity if the load increases to a point where the 10 minutes cannot be guaranteed. Conversely, the customer may want to make sure the maximum amount of load can be attached to the UPS regardless of runtime, e.g., a power priority.

As new power conversion products emerge and increasing functionality can be delivered from a single unit, understanding the resource capacity dimensions, interrelationships, measurement and safe limitation becomes complex. Power conversion devices may be used to interact with the electrical power utility grid. For example, conventional power conversion devices are known that are coupled to an electrical utility grid that have multiple functions, e.g., a multi-function power regulator or unified power flow controller (UPFC). Another category of conventional devices, known as active filters, may measure, report and limit resource capacity typically based on current or voltage limits at higher order harmonic frequencies. Conventional active filters are used to improve power quality as it relates to current and voltage distortion.

The conventional multi-function power regulator or UPFC discussed above typically includes a synchronous compensator (STATCOM), or shunt converter, and a static synchronous series compensator (SSSCS), or series converter, connected to the electrical utility grid. The multi-function power regulator may be used to improve the power quality on the electrical utility grid by providing voltage and reactive power regulation. The shunt converter of a conventional multi-function power regulator may perform voltage regulation on the DC bus and voltage-ampere-reactive (VAR) regulation while the series converter may provide voltage regulation. The shunt converter functions and the series converter functions consume resources, inter cilia, RMS current, peak current, RMS voltage, respectively, which each have a resource capacity limit.

Conventional multi-function power regulators typically rely on setting hard limits for the resource capacity limits to prevent damage of the shunt converter, the series converter, and other components of the multi-function power regulator. Additionally, conventional multi-function power regulators typically rely on separate active filters discussed above to measure, report, and provide a limit capacity. However, to date, conventional multi-function power regulators have not been combined with active filters.

Thus, there is a need for a multi-function regulator that is able to provide operational priority and resource allocation to one or more of the shunt converter functions and/or the series converter functions and which can enable graceful scaling back of one or more functions that have reached a resource capacity limit to prevent damage to the various components of the multi-function power regulator.

BRIEF SUMMARY OF THE INVENTION

In one aspect, a multi-function power regulator for prioritizing functions and allocating resources thereof is featured. The multi-function power regulator includes a plurality of resources each having a resource capacity limit, a shunt converter configured to perform one or more shunt converter functions while consuming one or more of the resources, a series converter configured to perform one or more series converter functions while consuming one or more of the resources, a control engine coupled to the shunt converter, the series converter, and a plurality of sensors, the control engine configured to monitor and control the one or more shunt converter functions and the one or more series converter functions, and a priority control engine coupled to the control engine. The priority control engine is configured to set a priority order for performing the one or more shunt converter functions and/or the one or more series converter functions and configured to determine whether one or more resource capacity limits has been exceeded or not exceeded by the shunt converter functions and/or the series converter function and in response to one or more exceeded resource capacity limits adjust the operation of the shunt converter functions and/or the series converter based on the priority order such that the one or more resource capacity limits exceeded is no longer exceeded.

In one embodiment, the one or more shunt converter functions may include voltage regulation on the DC bus, voltage-ampere reactive (VAR) regulation, and current harmonic mitigation. The one or more series converter functions may include voltage regulation and voltage harmonic mitigation. The multi-function power regulator may include one or more control loop engines each having a loop filter with a loop gain adjuster responsive to the priority control engine configured to change the loop gain of the control loop engine such that the one or more resources consumed by the shunt converter functions and/or the series converter functions is adjusted based on the priority order. The one or more of the control loop engines may be configured to reduce the loop gain of the control loop engine when one or more of the resource capacity limits is exceeded such that the one or more of the resources consumed by the shunt converter functions and/or the series converter functions is reduced based on the priority order. The one or more of the control loop engines may be configured to increase the loop gain of the control loop engine when the all resources consumed by the one or more shunt converter functions and/or the one or more series converter functions do not exceed the one or more resource capacity limits to allow the one or more of the resources consumed by the shunt converter functions and/or the series converter functions to increase based on the predetermined priority order. The multi-function power regulator may include one or more control loop engines each associated with a predetermined voltage harmonic and each having a loop filter with a loop gain adjuster responsive to the priority control engine configured to change the loop gain of the control loop engine such that one or more of the resources consumed by voltage harmonic mitigation is adjusted based on the predetermined priority order. The one or more of the control loop engines may be configured to reduce the loop gain of the control loop engine when the one or more resource capacity limits is exceeded such that one or more of the resources consumed by voltage harmonic mitigation is reduced based on the predetermined priority order. The one or more of the control loop engines may be configured to increase the loop gain of the control loop engine when all resources consumed by voltage harmonic mitigation do not exceed the one or more resource capacity limits to allow one or more of the resources consumed by voltage harmonic mitigation to increase based on the predetermined priority order. The multi-function power regulator may include one or more control loop engines each having a loop filter with a loop gain adjuster configured to change the loop gain of the control loop engine in response to the priority control engine such that one or more of the resources consumed by VAR regulation is adjusted based on the predetermined priority order. The one or more of the control loop engines may be configured to reduce the loop gain of the control loop engine when the one or more resource capacity limits is exceeded such that one or more of the resources consumed by VAR regulation is reduced based on the predetermined priority order. The one or more of the control loop engines may be configured to increase the loop gain of the control loop engine when all resources consumed by VAR regulation do not exceed the one or more resource capacity limits to allow the one or more the resources consumed VAR regulation to increase based on the predetermined priority order. The multi-function power regulator may include one or more control loop engines each associated with a predetermined current harmonic and each having a loop filter with a loop gain adjuster responsive to the priority control engine may be configured to change the loop gain of the control loop engine such that one or more of the resources consumed by current harmonics mitigation is adjusted based on the predetermined priority order. The one or more of the control loop engines may be configured to reduce the loop gain of the control loop engine when the one or more resource capacity limits is exceeded such that the one or more of the resources consumed by current harmonics mitigation is reduced based on the predetermined priority order. The one or more of the control loop engines may be configured to increase the loop gain of the control loop engine when all resources consumed by current harmonic mitigation do not exceed the one or more resource capacity limits to allow one or more of the resources consumed by current harmonics mitigation to increase based on the predetermined priority order. The multi-function power regulator may include one or more control loop engines each may have a reference adjuster responsive to the priority control engine configured to change a reference for the control loop engine such that the resources consumed by the shunt converter functions and/or the series converter functions is adjusted based on the predetermined priority order. The one or more of the control loop engines may be configured to reduce difference between the reference and an input such that the resources consumed by the shunt converter functions and/or the series converter functions is reduced based on the predetermined priority order. The one or more of the control loop engines may be configured to reduce difference between the reference and a reference set point when all resources consumed by the one or more shunt converter functions and/or one or more series converter functions do not exceed the one or more resource capacity limits to allow one or more of the resources consumed by the shunt converter functions and/or the series converter functions to increase based on the predetermined priority order. The multi-function power regulator may include one or more control loop engines each associated with a predetermined voltage harmonic and each having a reference adjuster responsive to the priority control engine configured to change a reference for the control loop engine such that the resources consumed by the voltage harmonic mitigation is adjusted based on the predetermined priority order. The one or more of the control loop engines may be configured to reduce difference between the reference and an input such that the resources consumed voltage harmonic mitigation is reduced based on the predetermined priority order. The one or more of the control loop engines may be configured to reduce difference between the reference and a reference set point when an resources consumed by voltage harmonic mitigation do not exceed the one or more resource capacity limits to allow one or more of the resources consumed by voltage harmonic mitigation to increase based on the predetermined priority order. The multi-function power regulator may include one or more control loop engines each having a reference adjuster responsive to the priority control engine configured to change a reference for the control loop engine such that the resources consumed by VAR regulation is adjusted based on the predetermined priority order. The one or more of the control loop engines may be configured to reduce difference between the reference and an input such that the resources consumed by VAR regulation is reduced based on the predetermined priority order. The one or more of the control loop engines may be configured to reduce difference between the reference and a reference set point when all resources consumed by VAR regulation do not exceed the one or more resource capacity limits to allow one or more of the resources consumed by VAR regulation to increase based on the predetermined priority order. The multi-function power regulator may include one or more control loop engines each associated with a predetermined current harmonic and each having a reference adjuster responsive to the priority control engine configured to change a reference for the control loop engine such that the resources consumed by current harmonic mitigation is adjusted based on the predetermined priority order. The one or more of the control loop engines may be configured to reduce difference between the reference and an input such that the resources consumed by current harmonic mitigation is reduced based on the predetermined priority order. The one or more of the control loop engines may be configured to reduce difference between the reference and a reference set point when all resources consumed by current harmonic mitigation do not exceed the one or more resource capacity limits to allow one or more of the resources consumed current harmonic mitigation to increase based on the predetermined priority order. The one or more resources may include RMS voltage, RMS current, peak current, and power. The priority control engine may be configured to assign each of the shunt converter functions and the series converter function a priority.

In one aspect, a multi-function power regulator for prioritizing functions and allocating resources thereof is featured. The multi-function power regulator includes at least shunt converter and a series converter each configured to consume one or more resources each having a resource capacity limit while performing one or more shunt converter functions and/or one or more series converter functions. The multi-function power regulator also includes priority control engine configured to set a priority order for performing the shunt converter functions and/or the series converter functions and configured to determine whether one or more resource capacity limits has been exceeded or not exceeded by the shunt converter functions and/or the series converter function and in response to one or more exceeded resource capacity limits adjust the operation of the shunt converter functions and/or the series converter based on the priority order such that the one or more resource capacity limits exceeded is no longer exceeded.

In another aspect, a method for prioritizing and allocating resources of a multi-function power regulator is featured. The method includes monitoring and controlling one or more shunt converter functions and series converter functions each configured to consume one or more resources each having a resource capacity limit, setting a priority order for performing the shunt converter functions and/or the series converter functions, determining whether one or more of the resource capacity limits has been exceeded or not exceeded by the shunt converter functions and/or the series converter functions, and in response to one or more exceeded resource capacity limits, adjust the operation of the shunt converter functions and/or the series converter functions based on the priority order such that the one or more resource capacity limits is no longer exceeded.

In one embodiment, the method may further include the step of providing one or more control loop engines each having a loop filter with a gain adjuster. The method may further include changing the loop gain of the control engine such that one or more resources consumed by the shunt converter functions and the series converter functions is adjusted based on the priority order. The method may include reducing the loop gain of the control engine when one or more of the resource capacity limits is exceeded such that one or more of the resources consumed by the shunt converter functions and/or the series converter functions is reduced based on the priority order. The method may include increasing the loop gain of the control engine when all resources consumed by the one or more shunt converter functions and/or the series converter functions do not exceed the one or more resource capacity limits to allow one or more of the resources consumed by the shunt converter functions and/or the series converter functions to increase based on the predetermined priority order. The method may include providing one or more control loop engines each having a reference adjuster. The method may include changing a reference for the control engine such that all resources consumed by the shunt converter functions and/or the series converter functions are adjusted based on the predetermined priority order. The method may include reducing the difference between a reference and an input such that all resources consumed by the shunt converter functions and/or the series converter functions is reduced based on the predetermined priority order. The method may include reducing the difference between the reference and a reference set point when all resources consumed by the one or more shunt converter functions and/or the one or more series converter functions do not exceed the one or more resource capacity limits to allow one or more resources consumed by the shunt converter functions and/or the series converter functions increase based on the predetermined priority order.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
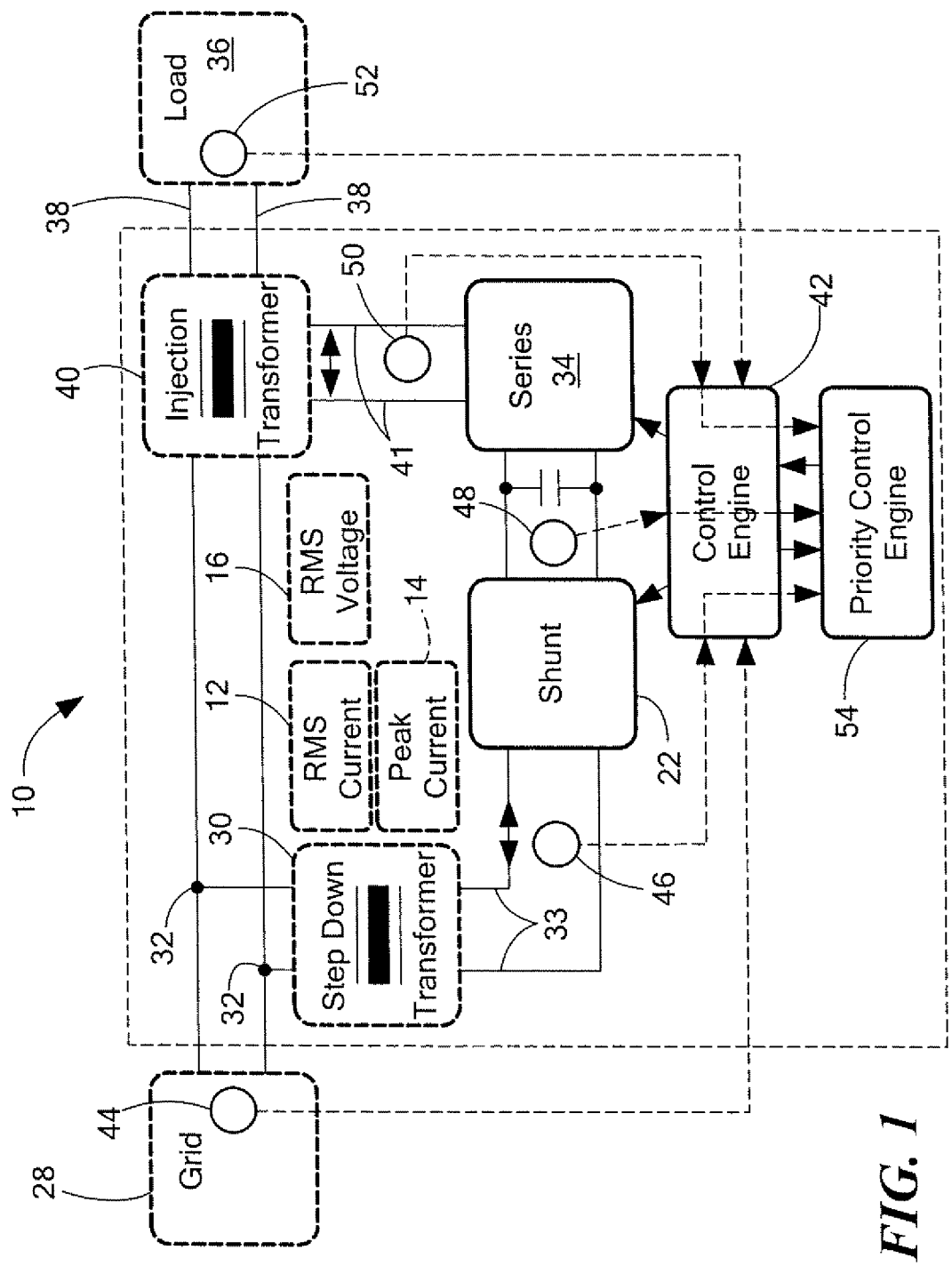
FIG. 1 is a schematic block diagram showing the primary components of one embodiment of the multi-function power regulator for prioritizing and allocating resources thereof of this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As will be appreciated by one skilled in the art, one or more embodiment of this invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "engine", "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples, inter alia, of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. As used herein, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, and the like.

Computer program code for carrying out operations of the present invention may be written in an object oriented programming language such as Java, Smalltalk, C++ or the like. However, the computer program code for carrying out operations of the one or more embodiment of this invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

There is shown in FIG. 1 one embodiment of multi-function power regulator 10 for prioritizing and allocating resources thereof. Multi-function power regulator 10 may be a UPFC multi-function power regulator or any similar type a multi-function power regulator preferably. Multi-function power regulator 10 includes a plurality of resources each having a resource capacity limit. In one example, the plurality of resources may include RMS current 12, peak current 14, and RMS voltage 16.

Multi-function power regulator 10 also includes shunt converter 22 configured to perform one or more shunt converter functions while consuming one or more of resources 12-16. In one example, the shunt converter functions performed by shunt converter 22 may include voltage regulation on DC bus 24, VAR regulation, e.g., at electrical utility grid 28, and current harmonic mitigation, e.g., at grid 28. In this example, the resources consumed by the shunt converter functions may be one or more of RMS current 12 and peak current 14.

In one embodiment, multi-function power regulator 10 may include step-down transformer 30 coupled between electrical utility grid 28 at 32 and inputs 33 of shunt converter 22 as shown. Step-down transformer 30 preferably steps the high voltage on electrical utility grid 28 at 32 to a lower voltage at inputs 33 of shunt converter 22. In one example the high voltage on grid 28 may be about 12,000 V AC or higher and the lower voltage at inputs 33 of shunt converter 22 may be about 240 V AC. In other examples, the voltage on grid may be as high as 500,000 V AC when step-down transformer is utilized or may be much lower than 12,000 V AC, in which case step-down transformer 30 may or may not be utilized.

Multi-function power regulator 10 also includes series converter 34 configured to perform one or more series converter functions while consuming one or more of resources 12-16. The shunt converter functions performed by series converter 34 may include voltage regulation, e.g., at load 36, and voltage harmonic mitigation, e.g., at load 36. The resources consumed by these functions may include RMS voltage 16.

In one design, multi-function power regulator 10 may include injection transformer 40 coupled between the grid voltage at 32, load 36 at 38, and outputs 41 of series converter 34. In this example, to perform voltage regulation and voltage harmonic mitigation, injection transformer 40 adds the AC voltage from the output of series converter 34 to the grid voltage at 32 to create the resulting AC voltage at load 36. Similar as discussed above with regard step-down transformer 30, injection transformer 40 may or may not be utilized.

In one design, RMS current 12 and peak current 14 are preferably at the interface between step-down transformer 30 and inputs 33 of shunt converter 22. At this interface, all operational functions within multi-function power regulator 10 may influence the resulting RMS current 12 and peak current 14. RMS voltage 16 is at the interface between injection transformer 40 and inputs 41 of series converter 34 At this interface, the voltage waveform is the aggregate of the fundamental and all the voltage harmonics being generated by series convertor 34 for voltage regulation and voltage harmonic mitigation.

Although as shown in FIG. 1, grid 28 is shown coupled proximate shunt converter 22 and load 36 is shown proximate series converter 34, this is not a necessary limitation of this invention, as the location of grid 28 and load 36 may be interchanged.

System 10 also includes control engine 42 coupled to shunt converter 22 and series converter 34 as shown and a plurality of sensors, e.g., sensor 44 which measures the voltage and current at electrical utility grid 28, sensor 46 which measures the voltage and current at inputs 33 of shunt converter 22, sensor 48 which measures the voltage on DC bus 24, sensor 50 which measures the voltage and current at outputs 41 of series converter 34, and sensor 52 which measures the voltage and current at load 36. Control engine 42 monitors and controls one or more of the shunt converter functions and one or more of the series converter functions.

At DC bus 24, the active energy flowing in and out of DC bus 24 is preferably balanced. Shunt converter 22 preferably regulates the voltage at DC bus 24 which results in the balancing of the active energy into and out of DC bus 24. The balancing of the active energy flows at DC bus 24 is a highly dynamic operation. Active energy that is entering DC bus 24 supporting shunt converter functions may exit DC bus 24 performing a totally different shunt converter functions or series converter functions.

The real energy flowing through multi-function power regulator 10 is measured in watts and energy circulating on the AC interfaces is measured in VARs. Both contribute to actual power loss within multi-function power regulator 20 but it is only the real power measured in watts that passes through shunt converter 22 and series converter 34.

With the addition of voltage and harmonic mitigation functions to multi-function power regulation 10, the balancing of the active energy flows may become unstable if the operation of one or more of the shunt converter functions and/or the series converter functions becomes dependent upon the active energy derived from another shunt converter or series converter function.

Multi-function power regulator 10 also includes priority control engine 54 coupled to control engine 42 as shown. Priority control engine 54 sets a priority order for performing the one or more shunt converter functions and/or the one or more series converter functions and determines whether one or more of resource capacity limits of resources 12-16 has been exceeded, or not exceeded, by one or more shunt converter functions and/or one or more series converter functions. When priority control engine 54 determines that one or more of the resource capacity limits has been exceeded, it adjusts the operation of one or more of the shunt converter functions and/or one or more series converter functions based on the priority order such that the one or more of resource capacity limits of resources 12-16 that were exceeded are no longer exceeded. The resources capacity limit for each of resources 12-16 may be the maximum amount of resources that the resource can provide to be consumed by one or more shunt converter functions and/or the one or more series converter functions without causing any damage or degradation to the operation of multi-function power regulator 10.

To maintain stability, shunt converter 22 preferably needs to be managed by priority control engine 54 such that it leaves headroom to fully support the active energy for series convertor 34. For example, if the voltage harmonics energy consumed by series converter 34 is providing a portion of the voltage regulation active energy and if either energy flow was disrupted, the energy flow would need to instantly support shunt converter 22. If shunt convertor 22 was already at capacity, then the shunt converter functions would be impacted. Thus, to maintain stability of multi-function power regulator 10, the capacity of the multi-function power regulator 10 may be based on monitoring the capacity and potential energy flow for shunt converter 22 and series converter 34 using priority control engine 54.

As will be discussed in further detail below, to manage the resources of multi-function power regulator 10, multi-function power regulator 10 samples the voltage and/or current at each of sensors 44, 46, 48, 50, and 52 to obtain a set of time domain waveforms. For each time domain waveform, multi-function power regulator 10 preferably determines the amplitude of the fundamental (50/60 Hz) and each harmonic component. A transform, e.g., a Parks' Transformation, at each frequency of interest, a Fourier Transform, or similar type transform, on the time domain waveform may be performed to determine the phase and amplitude of the fundamental and each harmonic. Various voltages, currents and power parameters may be then calculated for the aggregate time domain waveform and for the fundamental part. From the calculated parameters, multi-function power regulator 10 determines the resource consumption by the one or more shunt converter functions and/or the one or more series converter functions. When a resource consumption limit is exceeded, priority control engine 54 scales back operation of the lower priority functions until the aggregate system limit is no longer being exceeded. When a resource allocation limit is exceeded for a specific shunt converter or series converter function, priority control engine 54 scales back operation for that function.

Figure 2:
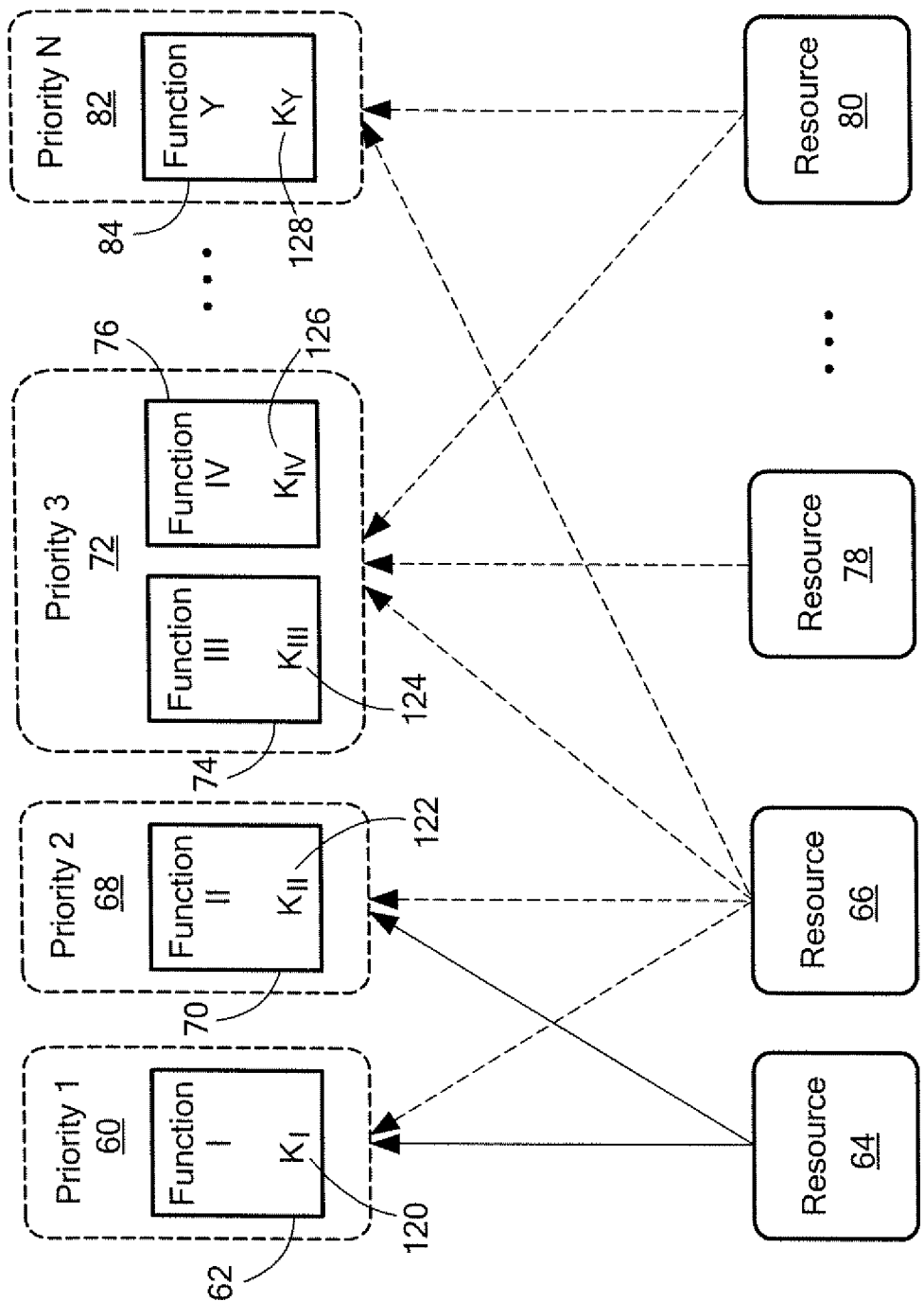
FIG. 2 is a schematic block diagram showing one example of a priority order of performing one or more of the shunt converter functions and/or series converter functions for the shunt converter and series converter shown in FIG. 1 and one example of the associated resources for those functions.

FIG. 2 shows one example of a priority order set by priority control engine 54, FIG. 1, for performing one or more shunt converter functions and/or series converter functions and the resources managed by priority control engine 54 for the functions. In this example, priority 1, indicated at 60, FIG. 2, is for function I-62 that consumes one or more of resources 64 and 66 while performing function I-62. Each of resources 64 and 66 has a resource capacity (or consumption) limit. Similarly, priority 2, indicated at 68, is for function II-70 which consumes one or more of resource 64 and 66. Priority 3, indicated at 72, is for both function III-74 and function IV-76, which together consume one or more resource 66, resource 78, and resource 80 which each have their own respective resource capacity limit. Similarly, priority N, indicated at 82, is for function Y-84 which consumes one or more of resources 66 and 80.

In this example, when priority control engine 54, FIG. 1, determines that a capacity limit for one or more of the resources 64, 66, 78, 80 has been exceeded, priority control engine 54 adjusts the operation of one or more of function I-62, function II-70, function III-74, function IV-76, and/or function Y-84 based on the priory order shown such that the one or more of resource capacity limits or resources 64, 66, 78, 80 that were exceeded is no longer exceeded. In this example, the function I-62, function II-70, function III-74, function IV-76, and/or function Y-84 may include one or more of the shunt converter functions and/or the series converter functions performed by shunt converter 22, FIG. 1, and/or series converter 34 and resources 64, 66, 78, and 80, FIG. 2, may be one or more of resources 12-16 discussed above with reference to FIG. 1.

The result is multi-function power regulator 10 for prioritizing functions and allocating resources is able to provide operational priority and resource allocation to one or more series converter functions and/or one or more shunt converter functions and enable a graceful, controllable, and predictable scaling back of lower priority functions to enable continued operation of higher priority functions that are being performed. Multi-function power regulator 10 also provides operational priority and resource allocation to each function multi-function power regulator 10 is performing and can also limit the resource consumption for each of the shunt converter functions and/or series converter functions being performed to leave unused capacity for higher priority functions to provide an operational buffer to ensure rapid response to quick changing conditions that may prevent higher priority functions from completely starving lower priority functions.

Figure 3:
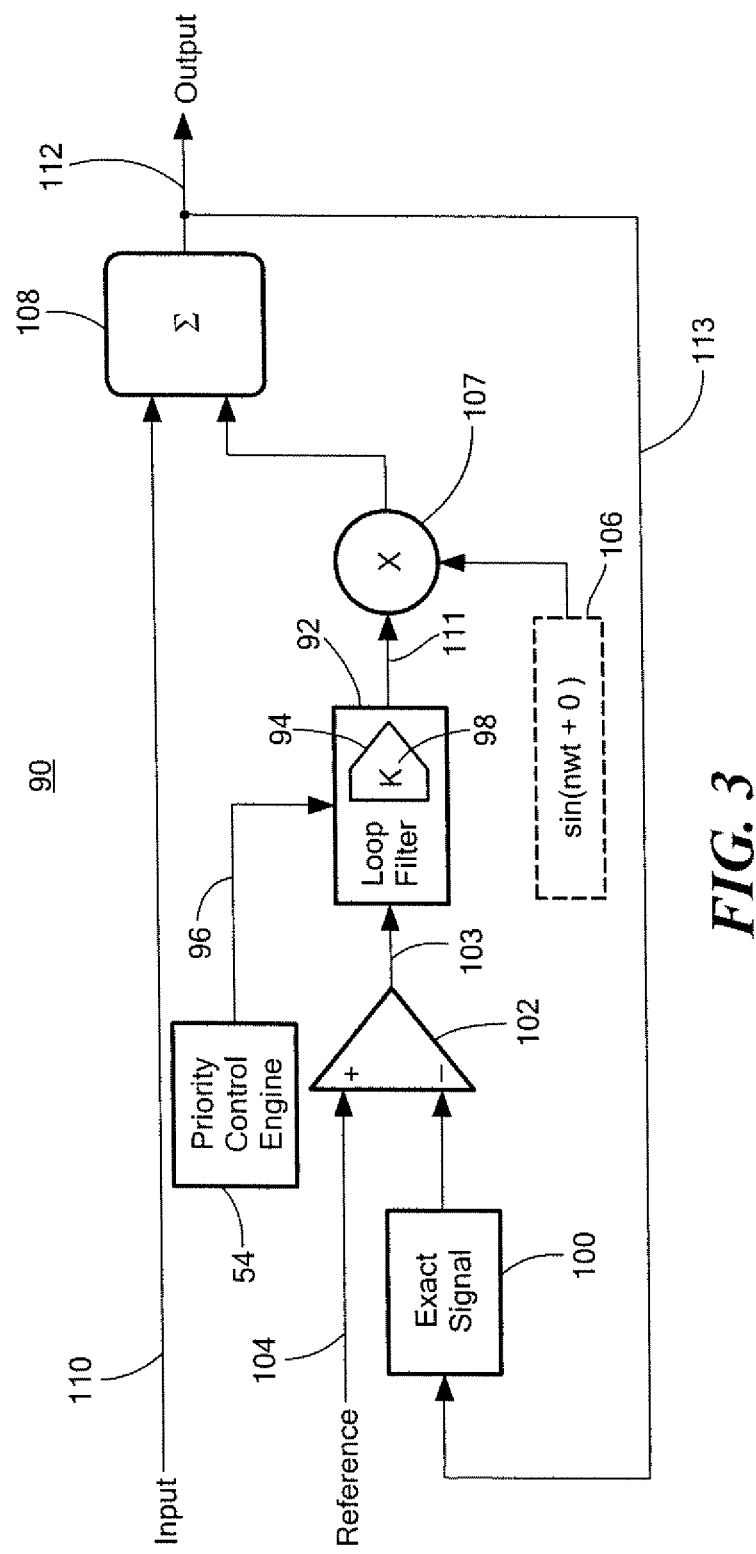
FIG. 3 is a schematic block diagram showing one example of a control loop engine with a loop gain adjuster of this invention configured to change the loop gain of the control engine such that one or more resources consumed by the shunt converter functions and/or the series converter functions of the shunt converter and series converter is adjusted based on a priority order.

In one embodiment, multi-function power regulator 10, FIG. 1, may include control loop engine 90, FIG. 3, having loop filter 92 with loop gain adjuster 94 responsive to priority control engine 54 at 96. Loop gain adjuster 94 is configured to change the loop gain K-98 of control loop engine 90 such that one or more of resources 12-16, FIG. 1, or resources 64, 66, 78, 80 FIG. 2, consumed by the shunt converter functions and/or the series converter functions is adjusted based on the predetermined priority order. As known by those skilled in the art, control loop engine 90 may include signal extractor 100 which may extracts signals of interest that are being mitigated, such as VAR regulation signals or current harmonic mitigation signals, FIG. 1, at inputs 33 of shunt converter 22 or voltage regulation or voltage harmonic mitigation signals at outputs 41 of series converter 34, from output signals 112, FIG. 3, in feedback by 113. Control loop engine 90 also preferably includes comparator 102 which compares the signals extracted by signal extractor 100 to reference signals 104 and outputs error signal 103, sine wave generator 106, multiplier 107, and summer 108 which combines input signals 110 with the output signals of multiplier 107 to generate output signals 112.

Figure 4:
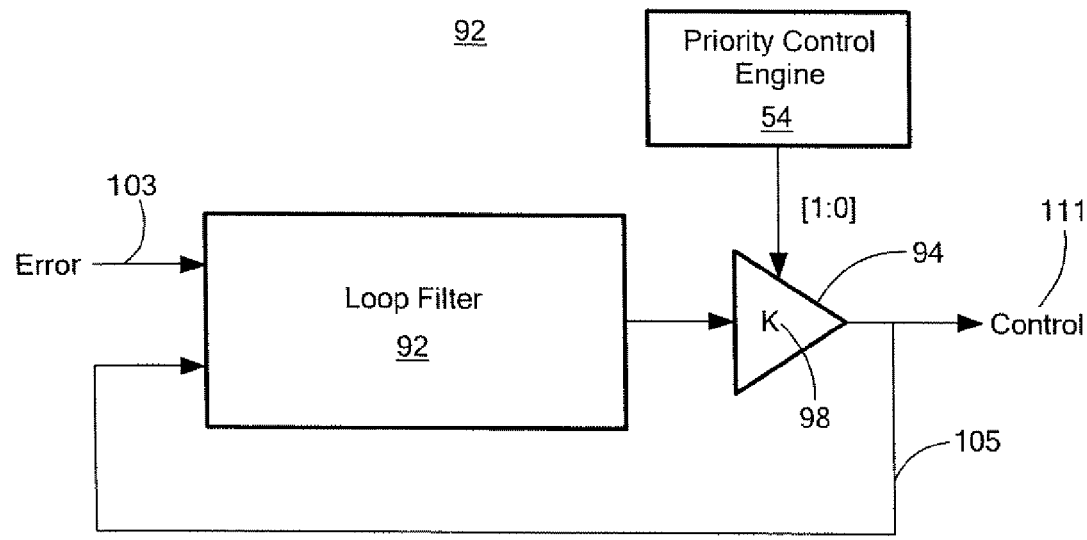
FIG. 4 is a schematic block diagram showing in further detail one example of the loop filter with a loop gain adjuster shown in FIG. 3.

FIG. 4, where like parts have been given like numbers, shows in further detail one example of loop filter 92 with loop gain adjuster 94 configured to change the loop gain K-98 of control loop engine 90, FIG. 3. In this example shown in FIG. 4, loop filter 92 may be an infinite impulse response (IIR) digital filter, or similar type filter known to those skilled in the art, that processes the input error signal 103 and combines this with feedback by 105 of the output control signal 111. Under normal operating condition when resource consumption of resources 12-16, FIG. 1, by one or more of the shunt converter functions and/or the series converter functions is within capacity limits, the value for loop gain, K-98, will be 1 which will cause the control loop to drive input error signal 103 to 0. When one or more the capacity limits for resources 12-16 are exceeded, the value for K-98 is preferably reduced as discussed in detail below resulting in a non-zero error value which reduces resource consumption by that function. Equation (1) below defines how the present output control value is related to the present and prior input error values and past control values:

$$Control[n] = k\left(\sum_{i=0}^{P-1} b_i Error[n-i] + \sum_{j=1}^{Q} a_j Control[n-j]\right) \quad (1)$$

Where Control[n] is the time domain output response of the HR Filter, Error[n] is the input time domain input sequence to the IIR Filter, $b_i$ is the feed forward coefficient for the IIR Filter, $a_j$ is the feedback coefficients for the IIR Filter, P is the number of feed forward coefficients in the IIR filter, Q is the number of feedback coefficients in the HR filter, and k is the loop gain value.

Stability may be achieved when the control values and error values are constant.

As will be discussed in further detail below, multi-function power regulator 10, FIG. 1, may include one or more loop engines 90, FIG. 3, that each may adjust the value of loop gain K-98 such that one or more of resources 12-16, FIG. 1, or resources 64, 66, 78, 80, FIG. 2, consumed by the shunt converter functions and/or the series converter functions is adjusted based on the predetermined priority order. For the example shown in FIG. 2, multi-function power regulator 10, FIG. 1, may include a plurality of control loop engines 90, FIG. 3, that each respectively set a value for the loop gain $K_I$-120, $K_{II}$-122, $K_{III}$-124, $K_{IV}$-126 and $K_Y$-128 associated with function I-62, function II-70, function III-74, function IV-76, and/or function Y-84 such that one or more of resources 64, 66, 78, 80 consumed by function I-62, function II-70, function III-74, function IV-76, and/or function Y-84 discussed above is adjusted based on the predetermined priority order shown.

For example, priority control engine 54, FIG. 1, may instruct one or more control loop engines 90, FIG. 3, to reduce the loop gain K-98, of control engine 90 when one or more of the capacity limits of resources 12-16, FIG. 1, has been exceeded such that one or more of resources 12-16, FIG. 1, consumed by the shunt converter functions and/or series converter functions is reduced. In a conventional control loop 90, FIG. 3, without loop gain adjuster 94, the value of loop gain, K, is equal to 1. In accordance with one embodiment of this invention, priority control engine 54 and loop gain adjuster 94 of one or more control loop engines 90 can reduce the value of loop gain K-98 to a value less than 1. The result is one or more of the resources 12-16, FIG. 1, consumed by the shunt converter functions and/or the series converter functions is reduced based on the priority order.

Similarly, in the example shown in FIG. 2, priority control engine 54, FIG. 1, may set a value for the loop gain $K_I$-120, $K_{II}$-122. $K_{III}$-124, $K_{IV}$-126 and $K_Y$-128 less than 1 such that one or more of resources 64, 66, 78, 80 consumed by functions I-62, function II-70, function III-74, function IV-76, and/or function Y-84 discussed above is reduced based on the predetermined priority order as shown.

In a similar manner, multi-function power regulator 10, FIG. 1, may include one or more control loop engines 90, FIG. 3, which may be configured to increase the loop gain K-98 of control loop engine 90 when all resources 12-16, FIG. 1, consumed by one or more of the shunt converter functions and/or the series converter functions do not exceed the resource capacity limits of resources 12-16 to allow one or more of resources 12-16 consumed by the shunt converter functions and/or the series converter functions to be increased based on the predetermined priority engine.

Similarly, primary control engine 54 may increase the value for the loop gain $K_I$-120, $K_{II}$-122, $K_{IV}$-126 and $K_Y$-128, FIG. 2, when all resources 64, 66, 78, 80 consumed by functions I-62, function II-70, function III-74, function IV-76, and/or function Y-84 do not exceed the resources capacity limits of resources 64, 66, 78, 80 to allow one or more of resources 64, 66, 78, 80 consumed by functions I-62, function II-70, function III-74, function IV-76, and/or function Y-84 to increase based on the predetermined priority order shown.

Figure 5:
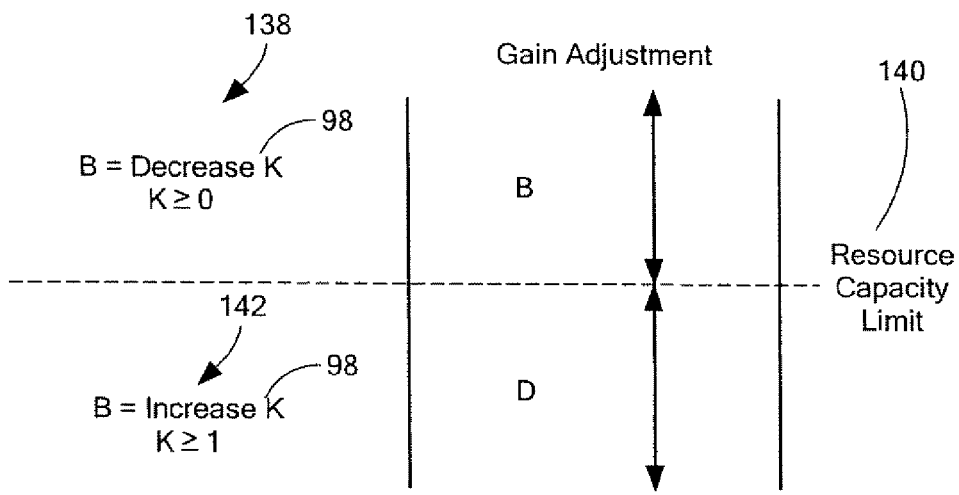
FIG. 5 depicts an example showing the loop gain of the control loop with a loop gain adjuster shown in FIG. 3 being increased or decreased in response to a resource capacity limit.

FIG. 5 graphically depicts one example of priority control engine 54 instructing loop gain adjuster 94, FIGS. 3 and 4, of one or more control loop engines 90 to decrease loop gain K-98, indicated at 138, when resource capacity limit 140 of one or more of resources 12-16, FIG. 1, is exceeded such that one or more resources consumed by the shunt converter functions and/or the series converter functions is reduced based on the priority order, or increase K-98, indicated at 142, FIG. 5, when all resources 12-16 consumed by the one or more shunt converter functions and/or the series converter functions do not exceed resource capacity limit 140 such that one or more resources consumed by the shunt converter functions and/or the series converter functions may be increased based on the predetermined priority order.

Figure 6:
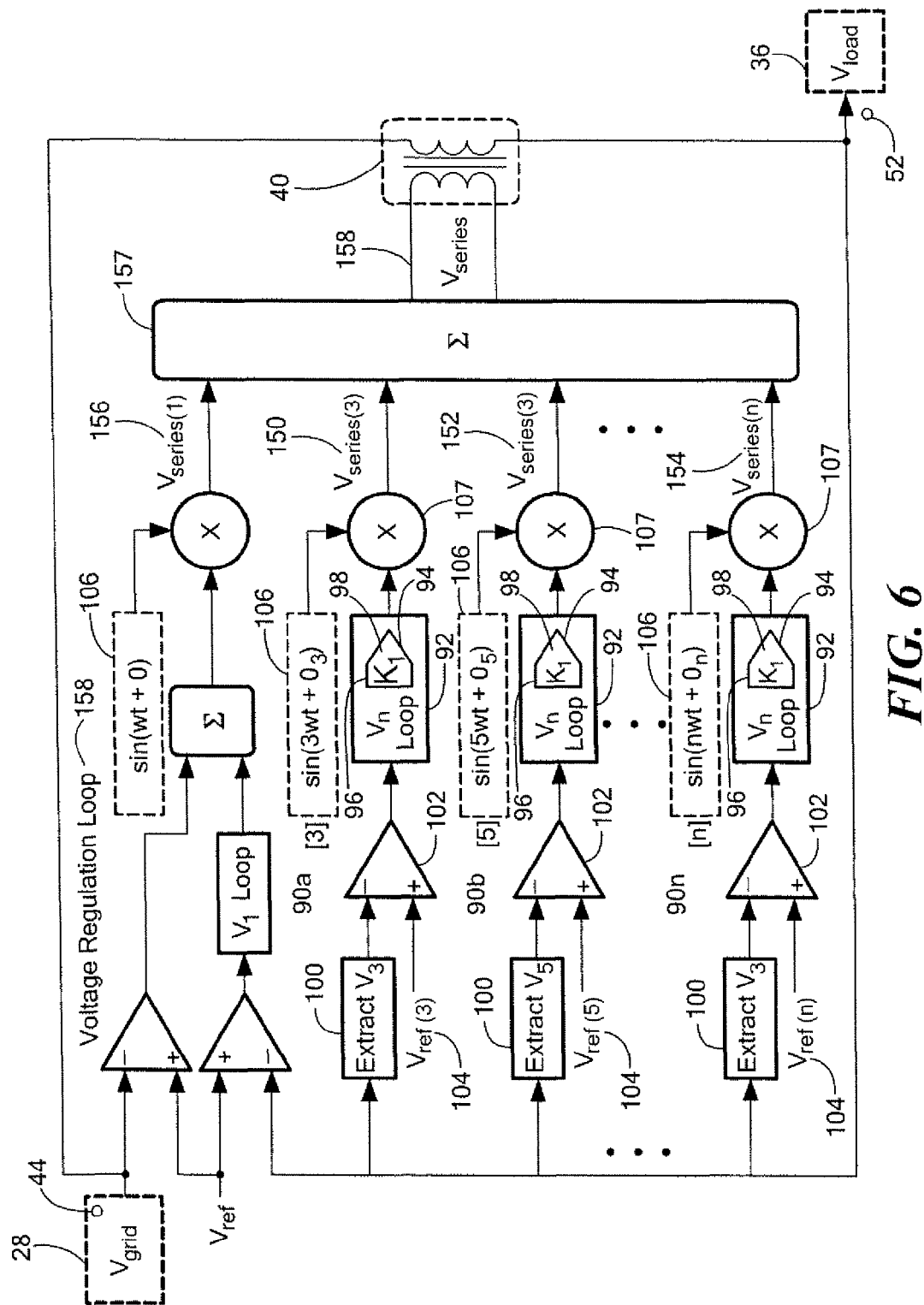
FIG. 6 is a schematic block diagram showing one example of multiple control loop engines with a loop gain adjuster with a loop gain adjuster shown in FIG. 3 configured to change the loop gain of one or more of the control engine such that one or more resources consumed by voltage harmonic mitigation is adjusted based on the predetermined priority order.

Multi-function power regulator 10, FIG. 1, with multiple control loop engines, e.g., control loop engine 90a, FIG. 6, where like parts have been given like numbers, control loop engine 90b, ... 90n, control loop engine 90n, each associated with a predetermined voltage harmonic. In this example, control loop engine 90a is associated with the third voltage harmonic, $V_{series(3)}$-150, control loop engine 90b is associated with the fifth voltage harmonic, $V_{series(5)}$-152, and control loop engine 90n is associated with the $N^{th}$ voltage harmonic, $V_{series(N)}$-154. In this example, $V_{series(1)}$-156 is the first voltage harmonic and is associated with conventional voltage regulation loop 158 which preferably performs the series converter function of voltage regulation discussed above.

Each of control loop engines 90a, 90b, ... 90n preferably include loop filter 92 with loop gain adjuster 94 responsive to priority control engine 54 at 96 configured to change the loop gain $K_1$-98 of one or more of control loop engines 90a, 90b ... 90n, such that one or more of resources 12-16, FIG. 1, e.g., RMS voltage 16, consumed by voltage harmonic mitigation is adjusted based on the predetermined priority order.

In the example shown, each of control loop engine 90a, 90b, ... 90n, include signal extractor 100 which extracts the RMS voltage $V_3, V_5, ... V_n$ for the voltage harmonic. Comparator 102 compares that signal the desired reference harmonic signal, $V_{ref(3)}$-104, $V_{ref(5)}$-104 ... $V_{ref(n)}$-104. Summer 157 sums the output of control loop engine 90a, 90b, ... 90n and generates output signals at 158 that are input to injection transformer 40 then output to load 36, as discussed above with reference to FIG. 1.

In one example, one or more of control loop engines 90a, 90b, ... 90n, FIG. 6, may be configured to reduce loop gain $K_1$-98 when one or more of the resource capacity limits of resources 12-16, FIG. 1, is exceeded such that one or more resources 12-16, e.g., RMS voltage 16, consumed by voltage harmonic mitigation is reduced based on the predetermined priority order. In a similarly manner, the loop gain of one more of $K_I$-120, $K_{II}$-122, $K_{III}$-124, $K_{IV}$-126 and $K_Y$-128, FIG. 2, may be reduced when one or more of resources 64, 66, 78, 80 is exceed such that one or more of resources 64, 66, 78, 80 consumed by voltage harmonic mitigation is reduced based on the predetermined priority order.

In another example, one or more of control loop engines 90a, 90b, ... 90n, FIG. 6, may be configured to increase the loop gain $K_1$-98 when all resources consumed by voltage harmonic mitigation do not exceed the resource capacity limits of resources 12-16, FIG. 1, to allow one or more of resources 12-16 consumed by voltage harmonic mitigation to increase based on the predetermined priority order. In a similarly manner, the loop gain of one or more of $K_I$-120, $K_{II}$-122, $K_{III}$-124, $K_{IV}$-126 and $K_Y$-128, FIG. 2, may be increased when all resources 64, 66, 78, 80 consumed by voltage harmonic mitigation do not exceed the resource capacity limits of resources 64, 66, 78, 80 to allow one or more of resources 64, 66, 78, 80 consumed by voltage harmonic mitigation to increase based on the predetermined priority order.

Figure 7:
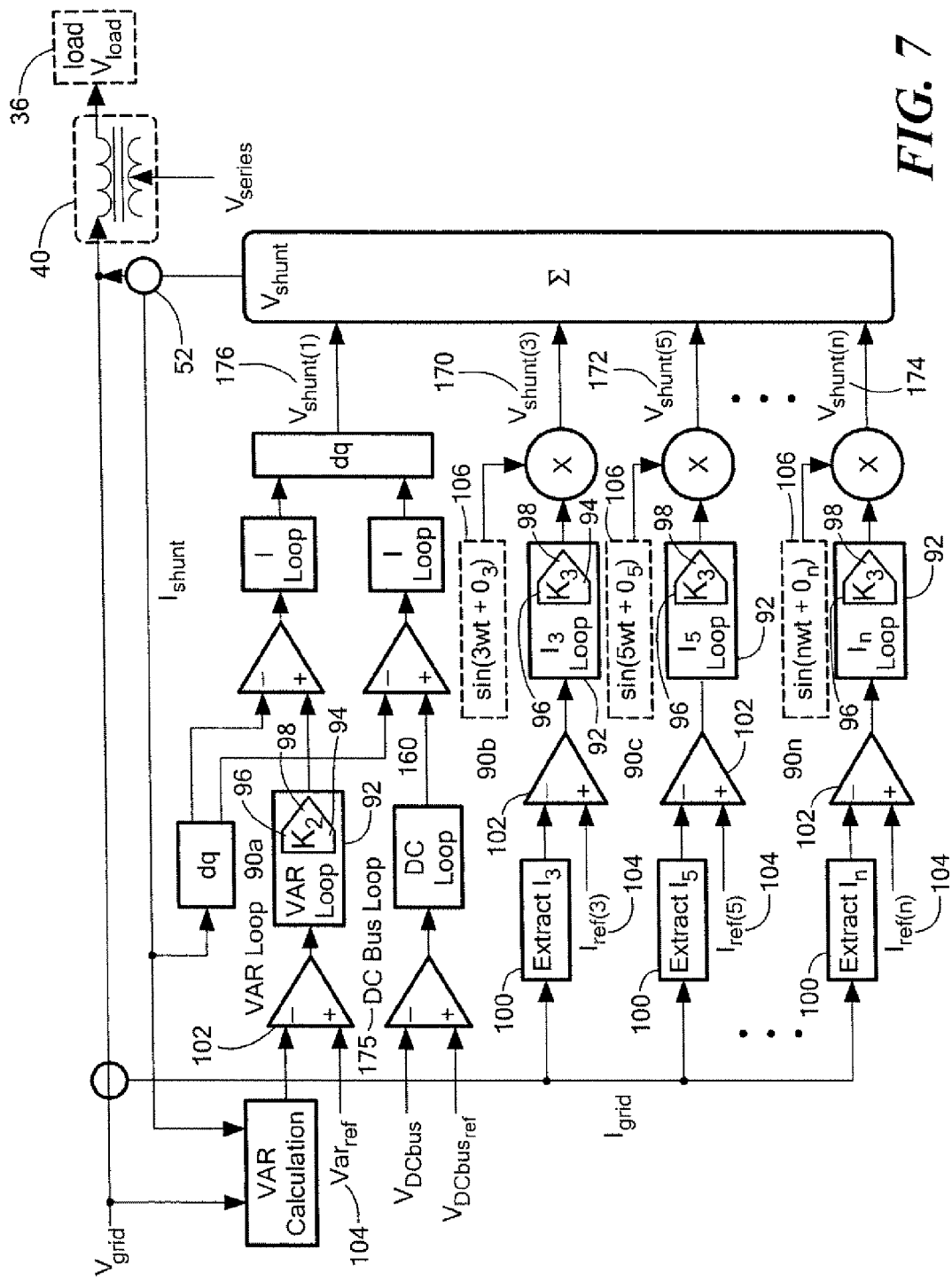
FIG. 7 is a schematic block diagram showing an example of multiple control loops each having a loop filter with a loop gain adjuster configured to change the loop gain of the control engine such that one or more resources consumed by VAR regulation and current harmonic mitigation is adjusted based on the predetermined priority order.

Multi-function power regulator 10, FIG. 7, where like parts have been given like numbers, may include control loop engine 90a with loop filter 92 having loop gain adjuster 94 responsive to priority control engine 54 at 96 configured to reduce loop gain $K_2$-98 when one or more of the resource capacity limits of resources 12-16, FIG. 1, is exceeded such that one or more resources 12-16, e.g., RMS current 12 and/or peak current 14, consumed by VAR regulation is reduced based on the predetermined priority order. In this example, reference signal 104 is the VAR reference signal, Var$_{ref}$-104 and control loop 90a with loop gain adjuster 92 is associated with the first voltage harmonic, V$_{shunt(1)}$-176. In a similarly manner, the loop gain of one or more of K$_I$-120, K$_{II}$-122, K$_{III}$-124, K$_{IV}$-126 and K$_Y$-128, FIG. 2, may be reduced when one or more of resources 64, 66, 78, 80 is exceed such that one or more of resources 64, 66, 78, 80 consumed by VAR regulation is reduced based on the predetermined priority order.

Control loop engine 90a with loop filter 92 having loop gain adjuster 94 may also be configured to increase the loop gain K$_2$-98 when all resources consumed by VAR regulation do not exceed the resource capacity limits of resources 12-16, FIG. 1, e.g., RMS current 12 and/or peak current 14, to allow one or more of resources 12-16 consumed by VAR regulation to increase based on the predetermined priority order. In Multi-function power regulator 10, FIG. 1 may also include multiple control loop engines 90b, 90c, ... 90n, FIG. 7, with each including loop filter 92 with loop gain adjuster 94 responsive to priority control engine 54 at 96 and each associated with a predetermined current harmonic. In this example, control loop engine 90b is associated with the third current harmonic, V$_{shunt(3)}$-170, control loop engine 90c is associated with the fifth current harmonic, V$_{shunt(5)}$-172, and control loop engine 90n is associated with the N$^{th}$ current harmonic, V$_{shunt(N)}$-174. In this example, V$_{shunt(1)}$-176 is the first current harmonic and is associated with control loop engine 90a and discussed above is also associated with DC bus loop 175 which preferably performs voltage regulation on DC bus 24, FIG. 1.

One or more of control loop engines 90b, 90c, ... 90n, FIG. 7, with loop gain adjuster 94, may be configured to reduce loop gain K$_3$-98 when one or more of the resource capacity limits of resources 12-16, FIG. 1, e.g., RMS current 12 and/or peak current 14, is exceeded such that one or more resources 12-16 consumed by current harmonic mitigation is reduced based on the predetermined priority order. In a similar manner, one or more of control loop engines 90b, 90c, ... 90n may reduce the loop gain of one or more of K$_I$-120, K$_{II}$-122, K$_{III}$-124, K$_{IV}$-126 and K$_Y$-128, FIG. 2, when one or more of resources 64, 66, 78, 80 is exceed such that one or more of resources 64, 66, 78, 80 consumed by current harmonic mitigation is reduced based on the predetermined priority order.

In another example, one or more of control loop engines 90b, 90c, ... 90n, FIG. 7, with loop gain adjuster 94 may be configured to increase the loop gain K$_3$-98 when all resources consumed by current harmonic mitigation do not exceed the resource capacity limits of resources 12-16, FIG. 1, to allow one or more of resources 12-16 consumed by current harmonic mitigation to increase based on the predetermined priority order. In a similarly manner, the loop gain of one or more of K$_I$-120, K$_{II}$-122, K$_{III}$-124, K$_{IV}$-126 and K$_Y$-128, FIG. 2, may be increased when all resources 64, 66, 78, 80 consumed by current harmonic mitigation do not exceed the resource capacity limits of resources 64, 66, 78, 80 to allow one or more of resources 64, 66, 78, 80 consumed by current harmonic mitigation to increase based on the predetermined priority order.

Figure 8:
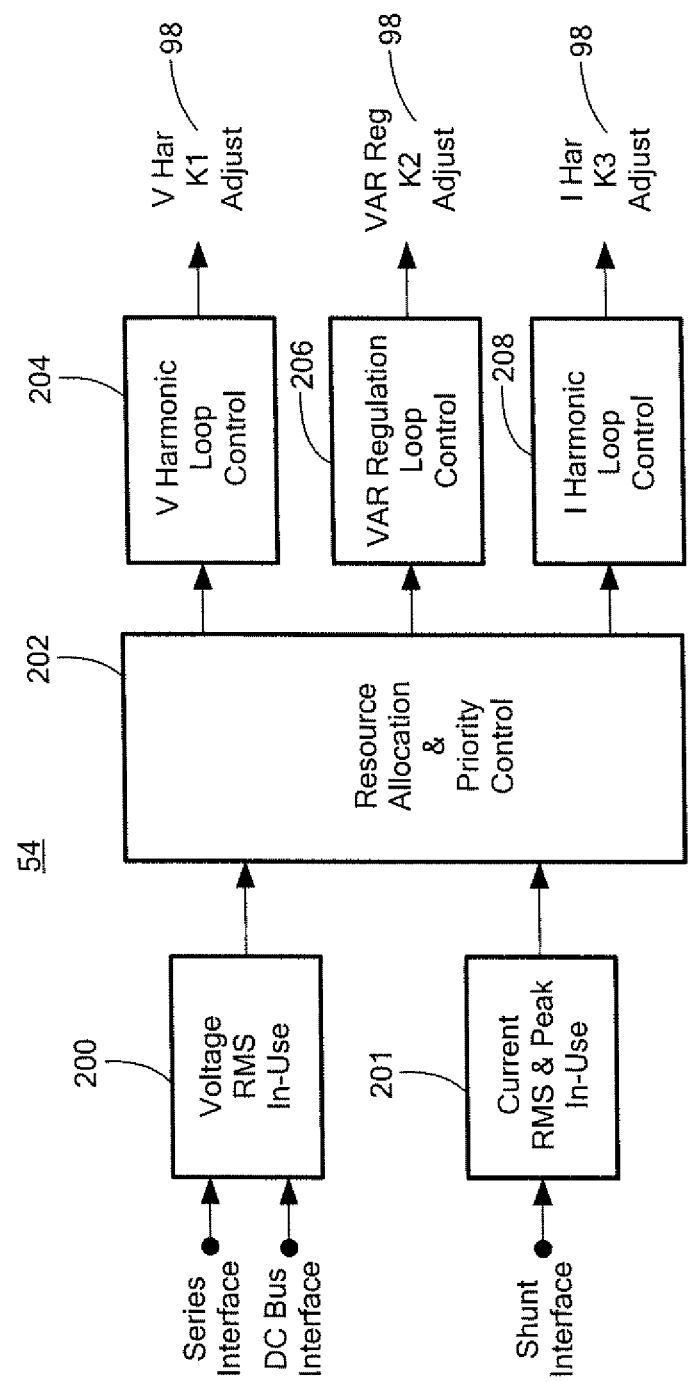
FIG. 8 is a schematic block diagram showing in further detail the primary components of one embodiment of the priority control engine shown in FIG. 1 that may be utilized to change the loop gain shown in one or more of FIGS. 2-7.

FIG. 8 shows one example of priority control engine 54, also shown in FIG. 1, managing the resource consumption of VAR regulation, voltage harmonic mitigation, and current harmonic mitigation as discussed above. In-Use module 200 preferably calculates the resource consumption of resources 12-16, FIG. 1, consumed by the series converter functions.

Current RMS and peak in-use module 201 preferably calculates the resource consumption of resources 12-16, FIG. 1, consumed by the shunt converter functions and/or the series converter functions. Resource allocation and priority control module 202, FIG. 8, preferably governs the allocation of resources 12-16, FIG. 1. V harmonic loop control module 204, FIG. 8, preferably generates the gain adjustment signal that adjusts loop gain K$_1$-98, e.g., as shown in FIG. 6, that may be used to regulate resource consumption for voltage harmonic mitigation. VAR regulation loop control module 206, FIG. 8, preferably generates the gain adjustment signal that adjusts loop gain K$_2$-98, e.g., as shown in FIG. 7, that may be used to regulate resource consumption for VAR regulation. I harmonic loop control module 208 preferably generates the gain adjustment signal that adjusts loop gain K$_3$-98, e.g., as shown in FIG. 7, that may be used to regulate resource consumption for current harmonic mitigation.

Resource allocation and priority control module 202 of priority control engine 54 preferably determines the necessary adjustments to resource allocations when one or more resource limits are exceeded. Resource allocation and priority control module 202 may be configured with each of the one or more shunt converter functions and/or the one or more series converter functions being assigned a priority, a minimum resource allocation, and a maximum resource consumption limit. Table 1 below shows one example of a priority and resource allocation configuration for each resource that priority control engine 54 is managing:

TABLE 1

Priority Resource Configuration
Resource [x] Configuration

| Priority | Function | Allocation | |
|---|---|---|---|
| | | Min | Max |
| 1 | Function I | 100% | 100% |
| 2 | Function II | 0% | 100% |
| 3 | Function III | 0% | 100% |
| 4 | Function IV | 0% | 100% |
| | Resource[x] Total | 100% | 100% |

Table 2 below shows one example of a default configuration for resource allocation and priority control module 202, FIG. 8. In this example, voltage regulation is preferably the top priority and is allowed to consume all resources if required. For series converter 34, FIG. 1, priority control engine 54 is monitoring RMS voltage 16 of the fundamental voltage and is calculating for the harmonics a RMS weighted sum of each harmonic. When the RMS weighted sum of the harmonics exceeds a capacity limit, priority control engine 54 scales back voltage harmonic mitigation operation. For shunt converter 22, priority control engine 54 is preferably monitoring both the total RMS current 12 and peak current 14 of the current waveform at inputs 33 of shunt converter 22. When either RMS current 12 or peak current 14 exceeds a capacity limits, priority control engine 54 scales back VAR regulation and current harmonic mitigation as both functions have been assigned the same priority in the example.

TABLE 2

Example Priority Control Configuration & Operation

| | | Resources Configuration | | Resource Consumption | | |
|---|---|---|---|---|---|---|
| | | Allocation | | Shunt | | Series |
| Priority | Function | Min | Max | $I_{rms}$ | $I_{peak}$ | $V_{rms}$ |
| 1 | V Reg. | 100% | 100% | | | Meas. |
| 2 | V Har. | 0% | Weighted | | | K1, Meas. |
| 3 | VAR Reg. I Har. | 0% | 100% | K2, K3 | K2, K3 | |
| Resource Total | | 100% | 100% | Meas. | Meas. | |

In another embodiment, instead of adjusting the loop gain K-98 of one or more control loop engines 90, FIGS. 3, 4, 6, and 7, as discussed above, multi-function power regulator 10, FIG. 1 may use one or more control loops including a reference adjuster to control the resource consumption of one or more of the shunt converter functions and/or the series converter functions by modifying a reference point that is used by the control loop. In this example, multi-function power regulator 10 includes one or more control loop engines, e.g., control loop engine 250, FIG. 9, each including reference adjuster 252 responsive to priority control engine 54 at 254 configured to change reference A-256 for control loop engine 250 such that the resources consumed by the shunt converter functions and/or the series converter functions is adjusted based on the predetermined priority order. As known by those skilled in the art, control loop engine 250 preferably includes signal extractors 268, 269, responsive to input signal 266 and output signal 291, comparator 281, loop filter 283, sine wave generator 285, multiplier 291, and summer 289 which generates output signal 291.

Figure 9:
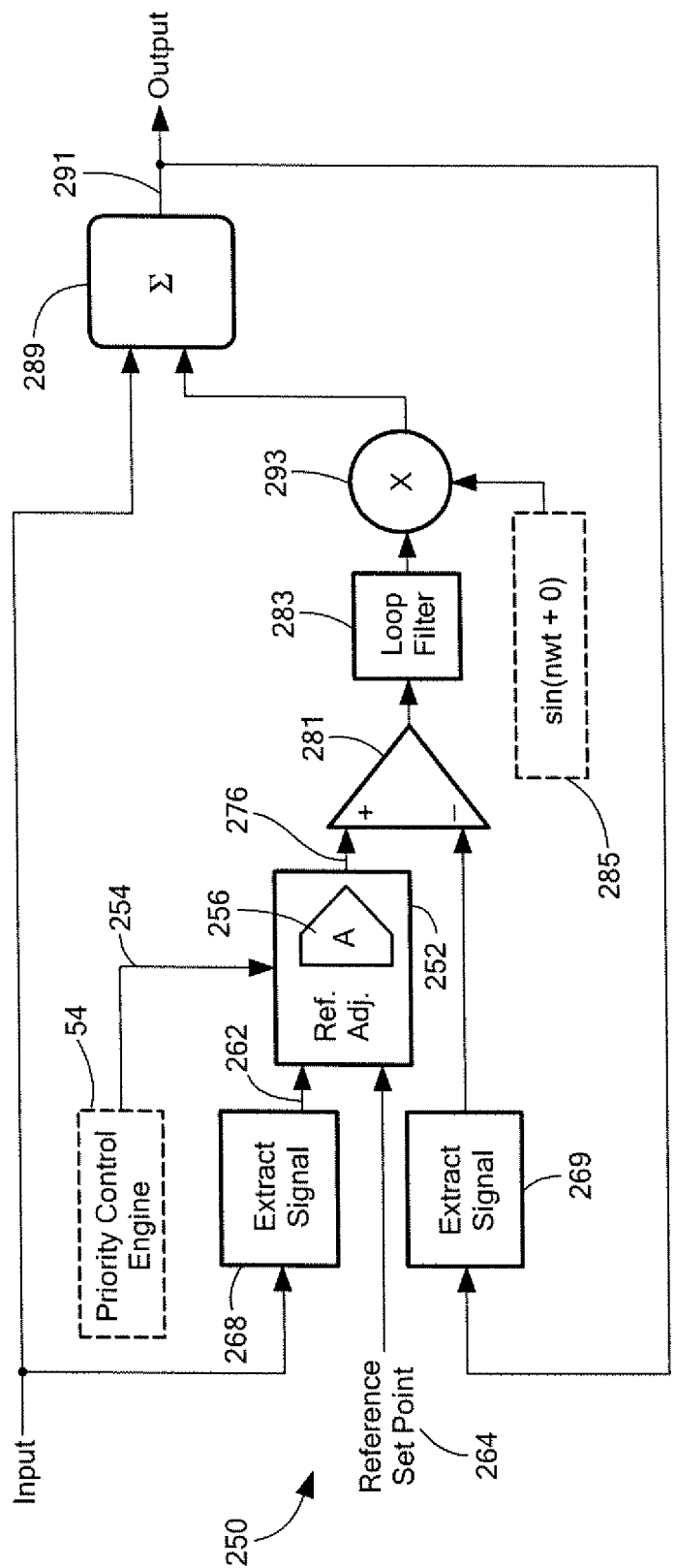
FIG. 9 is a schematic block diagram showing one example of a control loop engine with a reference adjuster of this invention configured to change a reference of the control engine such that one or more resources consumed by the shunt converter functions and/or the series converter functions is adjusted based on the predetermined priority order.
Figure 10:
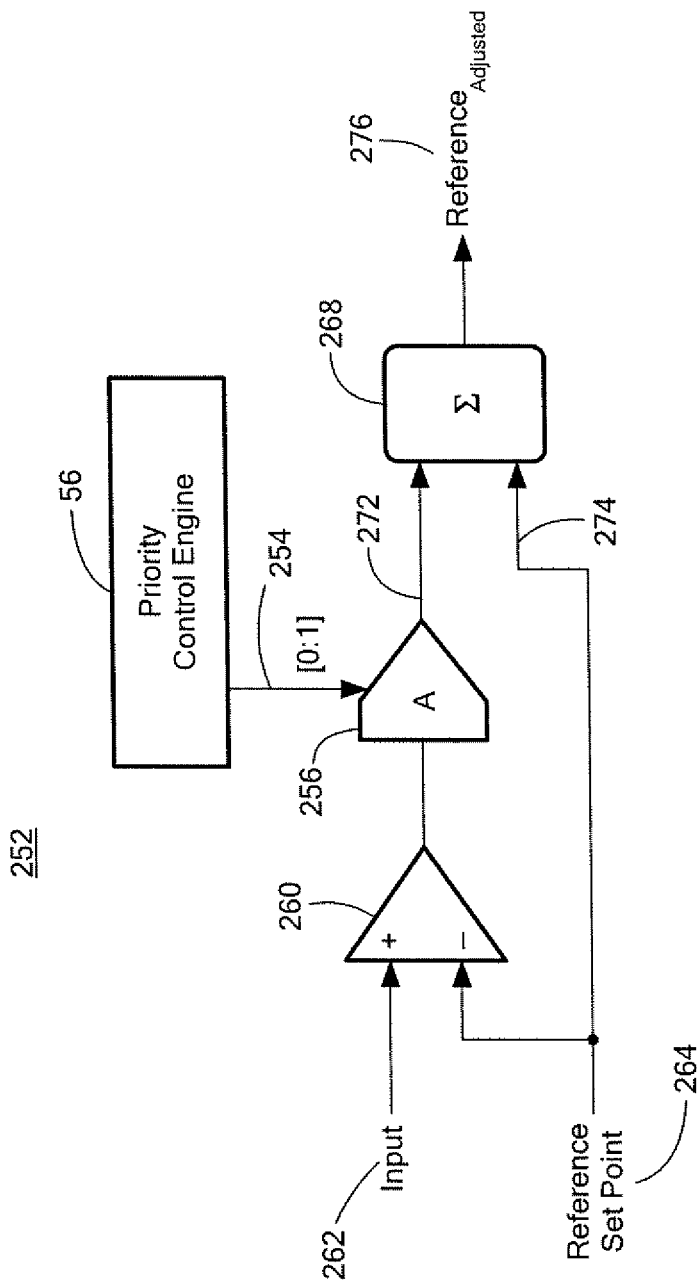
FIG. 10 is a schematic block diagram showing in further detail the primary components of the reference adjuster shown in FIG. 9.

FIG. 10 shows in further detail on example of reference adjuster 252 which changes the value of reference A-256 in response to an instruction from priority control engine 54 at 254. Reference adjuster 252 preferably includes comparator 260 which compares input signal 262 (extracted from input signal 266, FIG. 9, by extractor 268) to reference set point 264. Preferably, input signal 266 and extracted input 262 are not modified by control loop 250. Summer 268 sums the output of reference adjuster A-256 and reference set point 264 to generate reference signal 276.

In one example, control loop engine 250, FIGS. 9-10, with reference adjuster 252 may be configured to reduce the difference between reference signal 276 and input signal 262 such that one or more resources 12-16, FIG. 1, consumed by the shunt converter functions and/or the series converter functions is reduced based on the predetermined priority order.

In another example, control loop engine 250, FIGS. 9-10, with reference adjuster 256 may be configured to reduce the difference between reference signal 276 and reference set point 264 when all resources consumed by the one or more shunt converter functions and/or series converter functions do not exceed the capacity limits of resources 12-16, FIG. 1, to allow one or more of the resources consumed by the shunt converter functions and/or the series converter functions to increase based on the predetermined priority order.

Under typical operating conditions for multi-function power regulator 10, the value of reference adjuster A-256, FIGS. 9-10 of control loop engine 250 is equal to 0 when none of the resource capacity limits for resources 12-16, FIG. 1, are exceed. When the resource consumption by one or more of shunt converter functions and/or series converter functions exceeds a capacity limit of resources 12-16, priority control engine 54 increases the value of reference adjuster A-256 for one or more of control loop engine 250 so that the one or more shunt converter functions and/or series converter functions consume less resources and the capacity limits of resources 12-16 are no longer exceeded. In extreme overload situations, priority control engine 54 may set the value of reference A-256 to 1, effectively shutting down one or more shunt converter functions and/or series converter functions.

A relationship exists between the reference A-256 and loop gain, K-98, discussed above with reference to one or more of FIGS. 2-10 which is defined by equation (2) below.

$$A = 1 - K \qquad (2)$$

Thus, the design and operation of priority control engine 54 is the same for either the reference A-256 or loop gain K-98 to control resource consumption by one or more of the shunt converter functions and/or the series converter functions. Both methods could be used in parallel but in practice the selection of one method is sufficient for the invention to operate.

Figure 11:
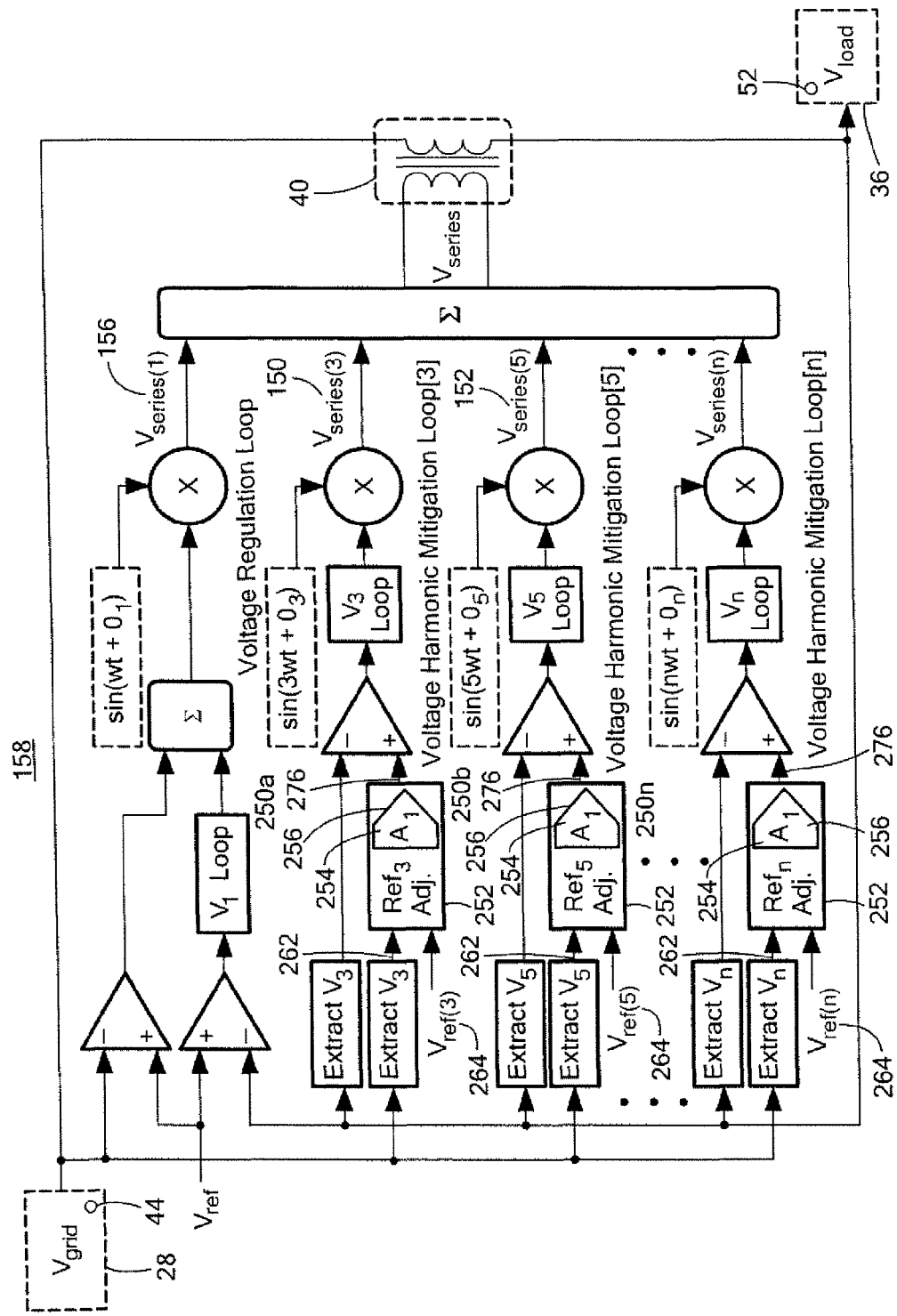
FIG. 11 is a schematic block diagram showing an example of multiple control loop engines each with a reference adjuster shown in FIG. 9 configured to change a reference of the control engine such that one or more resources consumed by voltage harmonic mitigation is adjusted based on the predetermined priority order.

Multi-function power regulator 10, FIG. 1, may include multiple loop engines 250a, 250b, . . . 250n, FIG. 11, where like parts have been given like numbers, each associated with a predetermined voltage harmonic and each having reference adjuster 252 responsive to priority control engine 54 at 254 configured to change reference $A_1$-256 such that the resources consumed by voltage harmonic mitigation is adjusted based on the predetermined priority order. In this example, control loop engine 250a is associated with the third voltage harmonic, $V_{series(3)}$-150, control loop engine 250b is associated with the fifth voltage harmonic, $V_{series(5)}$-152, and control loop engine 250n is associated with the $N^{th}$ voltage harmonic, $V_{series(N)}$-454, similar as discussed above with reference to FIG. 6. In this example, reference set point 264 discussed above with reference to FIGS. 9 and 10 is $V_{ref(3)}$-264, FIG. 11, $V_{ref(5)}$-264, and $V_{ref(n)}$-264, respectively for the associated voltage harmonic. In this example, input signal 262, FIG. 11, is the extracted voltage harmonic signal, V3, V5, and Vn, respectively for the associated voltage harmonic. The reference signal is indicated at 276. In this example, $V_{series(1)}$-156 is the first voltage harmonic and is associated with voltage regulation loop 158 which preferably performs the series converter function of voltage regulation discussed above.

In this example, one or more of control loops 250a, 250b, . . . 250n is configured to reduce the difference between the reference signal 276 and input signal 262 such that the resources consumed by voltage harmonic mitigation is reduced based on the predetermined priority order.

In another example, one or more control loop engines 250a, 250b, . . . 250n, FIG. 11, each with reference adjuster 252 may be configured to reduce the difference between respective reference signal 276 and reference set point $V_{ref(3)}$-264, $V_{ref(5)}$-264, and $V_{ref(n)}$-264, respectively, when all resources consumed by voltage harmonic mitigation do not exceed the capacity limits of resources 12-16, FIG. 1, to allow one or more of the resources consumed by voltage harmonic mitigation to increase based on the predetermined priority order.

Figure 12:
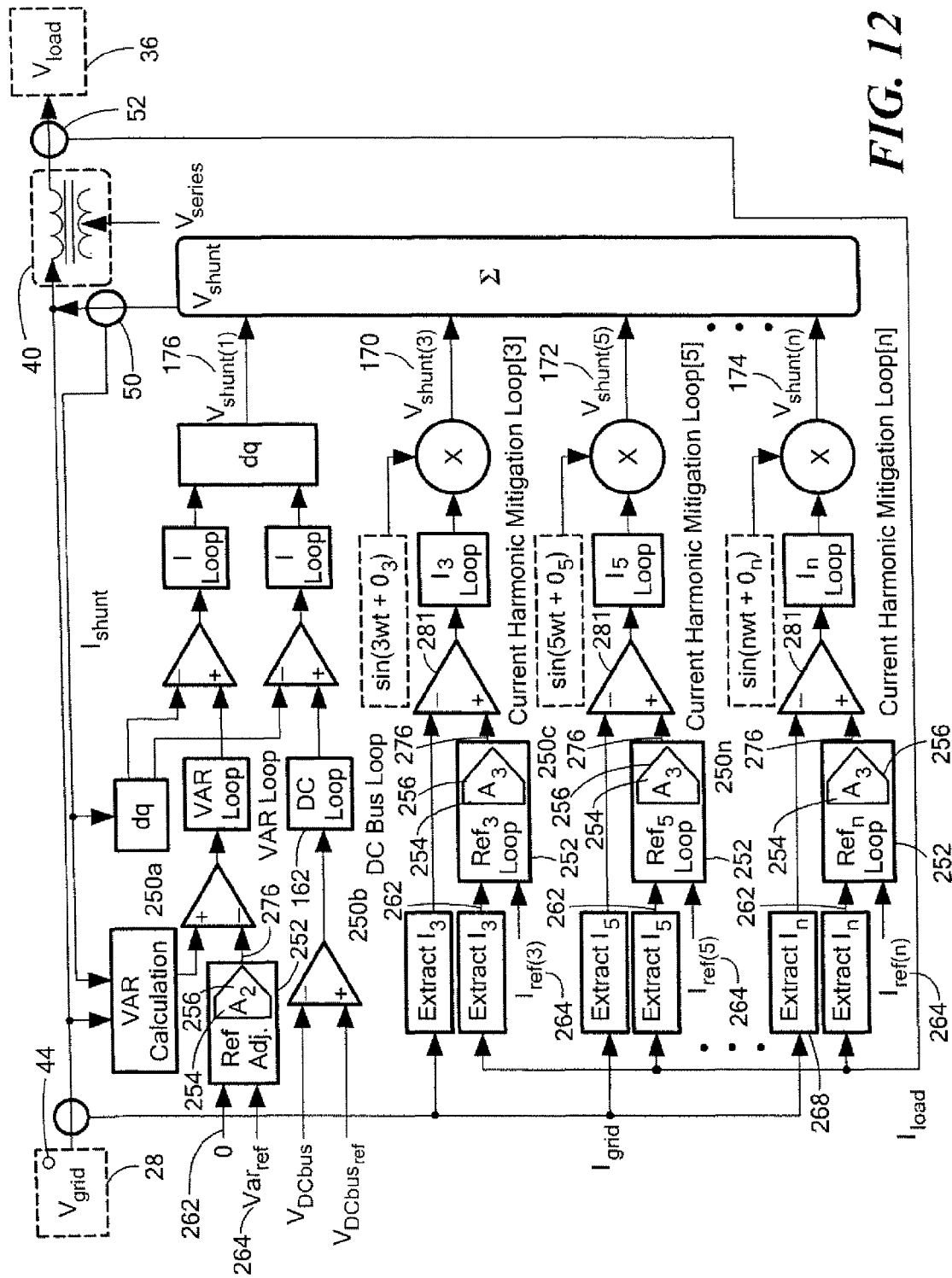
FIG. 12 is a schematic block diagram showing on example of multiple control loop engines with a reference adjuster shown in FIG. 9 configured to change a reference of one or more of the control engine such that resources consumed by VAR regulation and current harmonic mitigation is adjusted based on the predetermined priority order.

Similarly, multi-function power regulator 10, FIG. 1, may include control loop engine 250a, FIG. 12, having reference adjuster 252 responsive to priority control engine 54 at 254 configured to change reference $A_2$-256 such that resources consumed by VAR regulation is adjusted based on the predetermined priority order. In this example, control loop engine 250a is associated with the first current harmonic, $V_{shunt(1)}$-176. $V_{shunt(1)}$-176 is also associated with DC bus loop 162 which preferably performs voltage regulation on DC bus 24, FIG. 1.

In this example, control loop 250*a* with reference adjuster 252, may be configured to reduce the difference between the reference 276 and input $Var_{ref}$-262 such that the resources consumed by VAR regulation is reduced based on the predetermined priority order.

Control loop engine 250*a* with reference adjuster 252 may also be configured to reduce the difference between reference 276 and reference set point $Var_{ref}$-264 when all resources consumed by VAR regulation do not exceed the capacity limits of resources 12-16, FIG. 1, to allow one or more of the resources consumed by VAR regulation to increase based on the predetermined priority order.

Multi-function power regulator 10, FIG. 1, may also include one or more of control loop engines 250*b*, 250*c*, . . . 250*n*, FIG. 12, each associated with a predetermined current harmonic and each having reference adjuster 252, responsive to priority control engine 54 at 254 configured to change reference $A_3$-256 such that the resources consumed by current harmonic mitigation is adjusted based on the predetermined priority order. In this example, control loop engine 250*b* is associated with the third current harmonic, $V_{shunt(3)}$-170, control loop engine 250*c* is associated with the fifth voltage harmonic, $V_{shunt(5)}$-172, and control loop engine 250*n* is associated with the $N^{th}$ voltage harmonic, $V_{shunt(N)}$-174, similar as discussed above with reference to FIG. 7.

In this example, one or more of control loops 250*b*, 250*c*, . . . 250*n* is configured to reduce the difference between the reference signal 276 and input signal $I_3$-262, $I_5$-262, and $I_n$-262, respectively, such that the resources consumed by current harmonic mitigation is reduced based on the predetermined priority order.

One or more control loop engines 250*b*, 250*c*, . . . 250*n*, each with reference adjuster 252 may be configured to reduce the difference between reference 276 and reference set point $I_{ref(3)}$-264, $I_{ref(5)}$-264, $I_{ref(n)}$-264, respectively, when all resources consumed by current harmonic mitigation do not exceed the capacity limits of resources 12-16, FIG. 1, to allow one or more of the resources consumed by current harmonic mitigation to increase based on the predetermined priority order.

Figure 13:
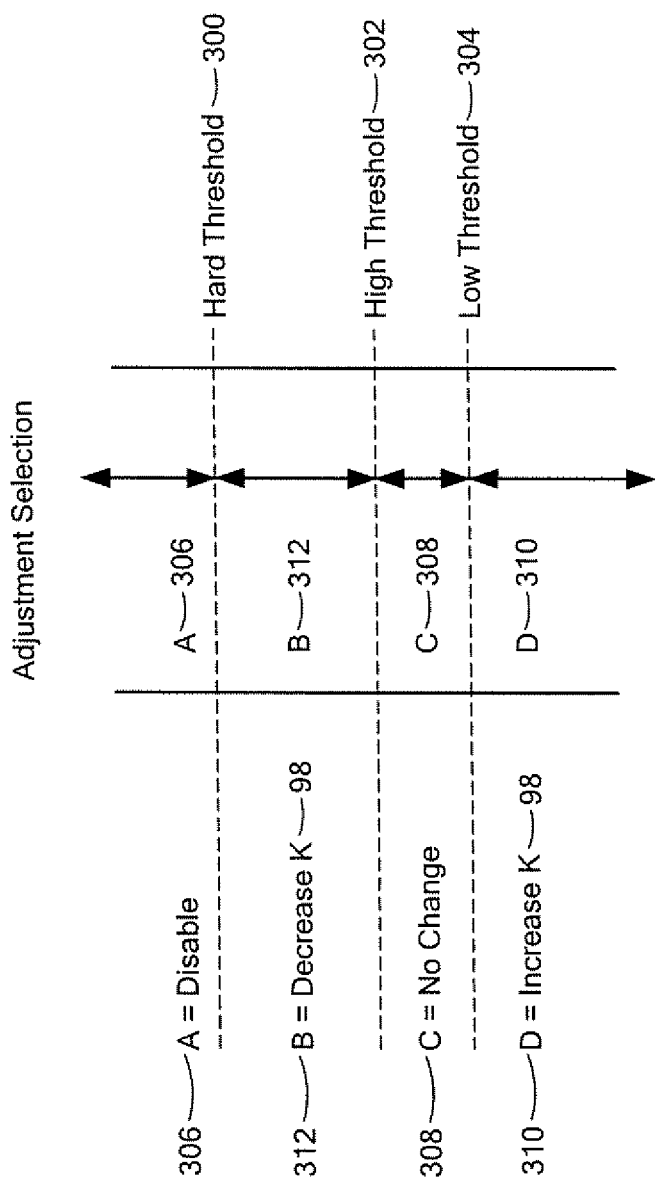
FIG. 13 shows an example of thresholds which may be used to determine when the loop gain of one or more of the control loop engines with a loop gain adjuster shown in one or more of FIGS. 1-12 changed such that one or more resources consumed by the one or more shunt converter functions and/or the series converter functions is adjusted based on the priority order.

FIG. 13 shows one example of the adjustment thresholds, e.g., hard threshold 300, high threshold 302, and low threshold 304 that may be used to modify the loop gain K-98 discussed above with reference to one or more of FIGS. 3-8 for one or more of the shunt converter functions and/or series converter functions. In this example, each of the shunt converters functions and/or the series converter functions will have a different set of thresholds that may be used to determine when and by how much the loop gain, K-98, is adjusted. When a shunt converter or series converter function consumes resources above its hard threshold 300, the function is preferably disabled, indicated by A-306. Normal resource consumption for multi-function power regulator 10 is preferably below the low threshold 304 where priority control engine 54 preferably increases loop gain K-98 up to 1, indicated by D-310. When resource consumption of one or more of the shunt converter functions and/or the series converter functions is between low threshold 304 and high threshold 302, no change to the loop gain K-98 preferably occurs, indicated by C-308. When resource consumption is between the high threshold 302 and hard threshold 300, the loop gain K-98 is preferably reduced, indicated by B-312, until resource consumption drops below high threshold 302.

For series converter 34, FIG. 1, equations (3) through (7) below may be are used to determine the threshold settings shown in FIG. 13 for RMS voltage resource 16. The thresholds shown in FIG. 13 for the voltage harmonic mitigation functions in the series converter are dynamic and based on the voltage regulation activity.

$$V_{series_{left}} = 2((V_{nominal})^2 - (V_{series(1)})^2) \quad (3)$$

$$V_{har_{usage}} = 2 \sum_{n=3,5,\ldots}^{15} (nV_{series(n)})^2 \quad (4)$$

$$V_{hard_{threshold}} = V_{series_{left}} + 2(V_{hard_{hysteresis}})^2 \quad (5)$$

$$V_{high_{threshold}} = V_{series_{left}} \quad (6)$$

$$V_{low_{threshold}} = V_{series_{left}} - 2(V_{low_{hysteresis}})^2 \quad (7)$$

$V_{series_{left}}$ is the Square of RMS Voltage Available for Harmonic Mitigation, $V_{nominal}$ is the RMS Voltage at the AC Series Compensator, $V_{series(1)}$ is the RMS Voltage of fundamental at the AC Series Compensator, $V_{series(n)}$ is the RMS Voltage of Harmonic (n), $V_{har_{usage}}$ is the Square of RMS Voltage being used for harmonic mitigation, $V_{hard_{threshold}}$ is the Hard Threshold level, $V_{high_{threshold}}$ is the High Threshold level, $V_{low_{threshold}}$ is the Low Threshold level, $V_{hard_{hysteresis}}$ RMS hysteresis margin for hard threshold and $V_{low_{hysteresis}}$ RMS hysteresis margin for low threshold.

Figure 14:
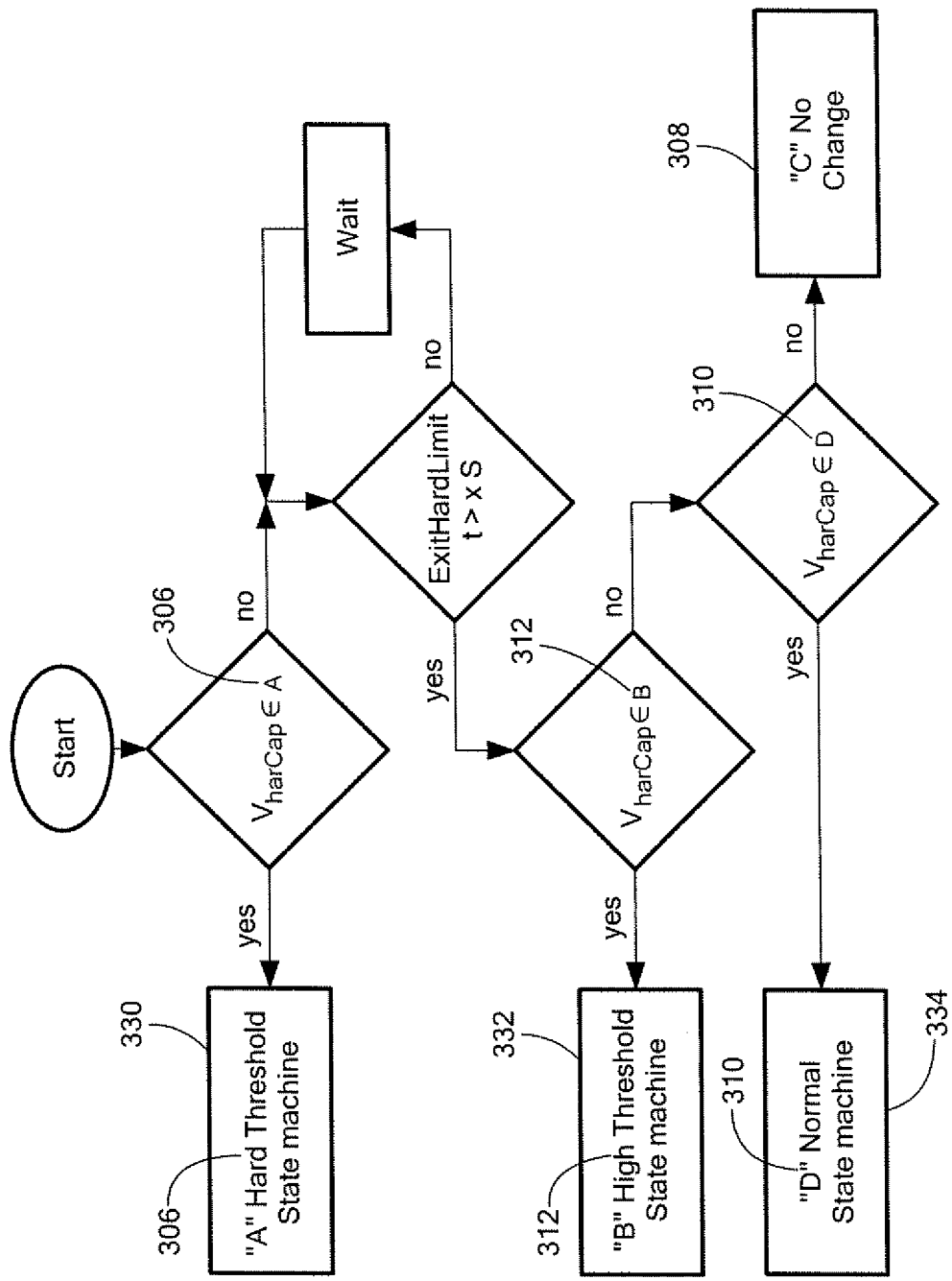
FIG. 14 is a flowchart depicting one example of steps that may be utilized for selecting a state machine used to adjust the loop gain $K_1$ shown in FIG. 6.

FIG. 14, where like parts have been given like numbers, shows an example of a flowchart of one example of a selection of hard state machine 330 associated with hard threshold 300, FIG. 13, and A-306, high state machine 332, FIG. 14, associated with high threshold 302, FIG. 13, and B-312, or normal or low state machine 334, FIG. 14, associated low threshold 304, FIG. 13, and D-310 that may be used to adjust the value of loop gain, $K_1$-98, FIG. 6, of one or more of control loop engines 90*a*, 90*b*, . . . 90*n* for voltage harmonic mitigation. Equation (8) below shows the same information using a mathematical expression. A state machine is logic utilized by priority control engine 54 that increases or decreases K-98. The state machine is the current value of K-98.

$$StateMachineSelection = \quad (8)$$
$$\begin{cases} A; & V_{har_{usage}} > V_{hard_{threshold}} \\ B; & V_{hard_{threshold}} > V_{har_{usage}} > V_{high_{threshold}} \\ C; & V_{high_{threshold}} > V_{har_{usage}} > V_{low_{threshold}} \\ D; & V_{low_{threshold}} > V_{har_{usage}} \end{cases}$$

Figure 15:
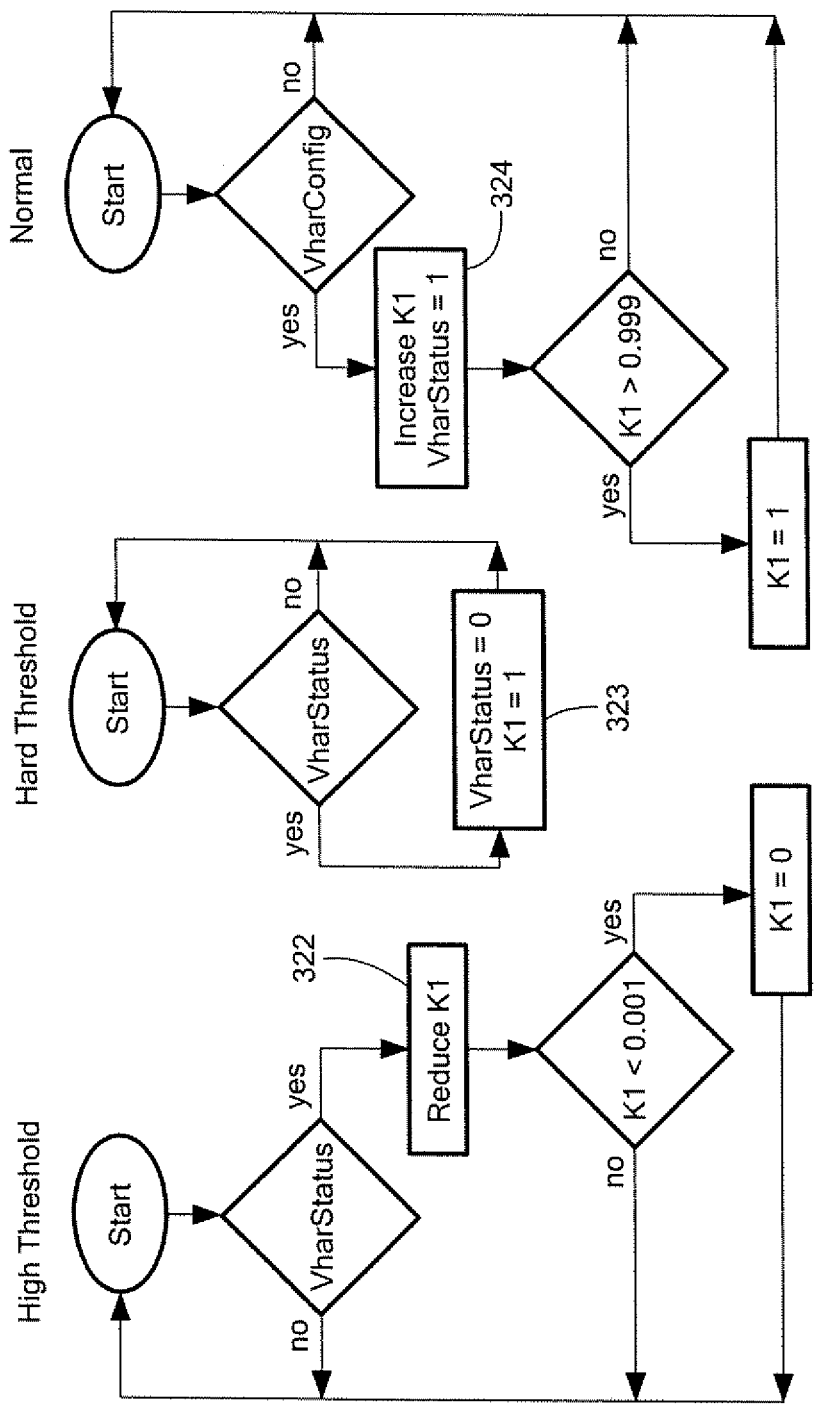
FIG. 15 shows in further detail the steps that may be utilized for three state machines shown in FIG. 14 used to change the loop gain $K_1$ shown in FIG. 6.

FIG. 15 shows a flowchart of one example of the steps associated with hard state machine 330, high state machine 332, and normal or low state machine 324, FIG. 14, which may be used to modify the value for $K_1$-98, FIG. 6, for series converter 34. In this example, hard state machine 330, FIG. 14, disables one or more of the series converter functions when resource consumption is over the hard threshold 300, FIG. 13, indicated at 320, FIG. 15. High state machine 314, FIG. 14, preferably decreases the value of $K_1$-98, indicated at 334, preferably limited to a minimum value of 0, until resource consumption drops below the low threshold 304, FIG. 13. Normal state machine 334, FIG. 14, preferably increases the value of $K_1$-98, FIG. 6, indicated at 324, FIG.

15, preferably limited to a maximum value of 1, until resource consumption exceeds low threshold 304, FIG. 13.

Figure 16:
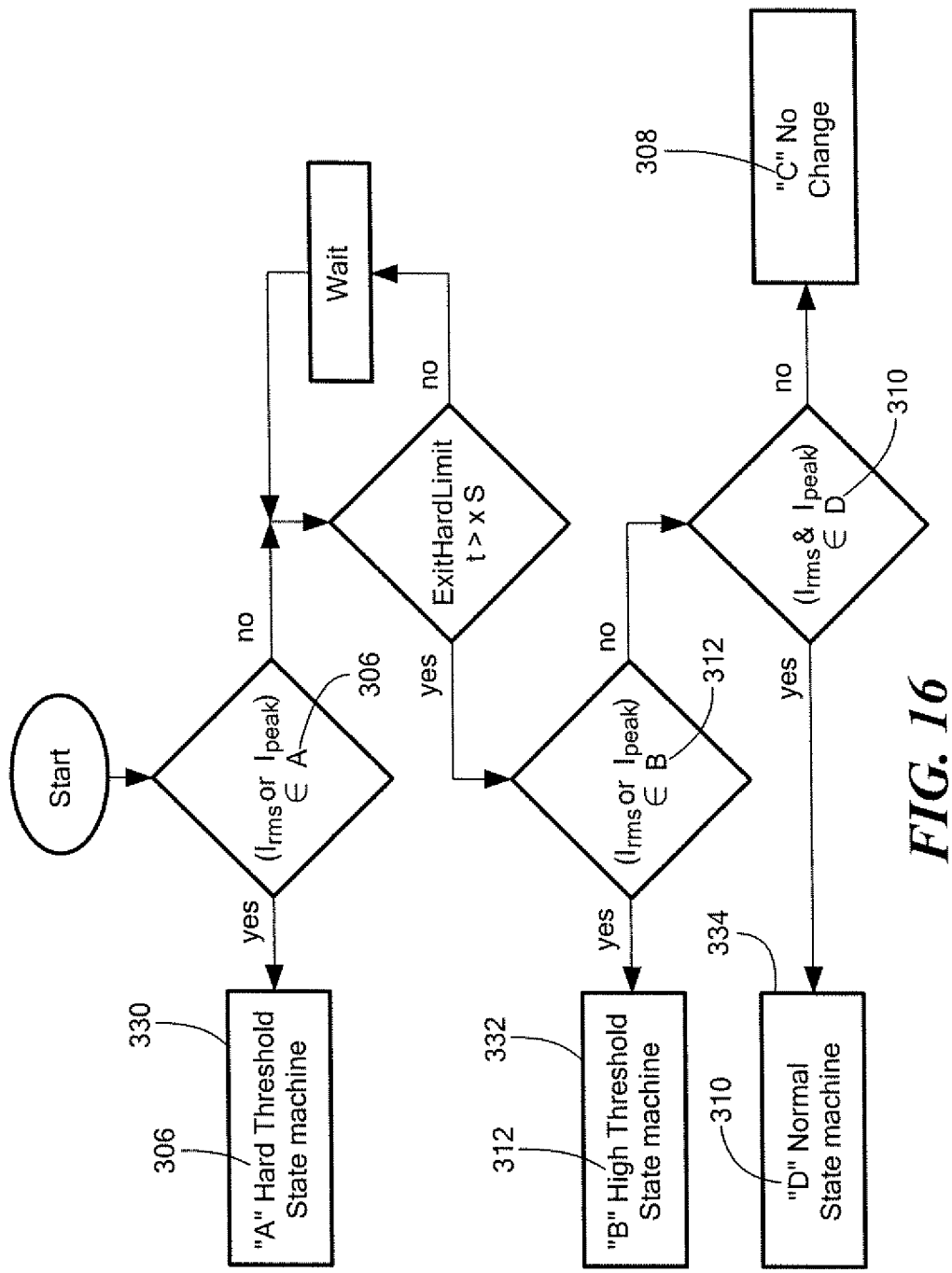
FIG. 16 is a flowchart showing one example of the steps that may be used for selecting the state machine that is used to adjust the loop gain $K_2$ and $K_3$ shown in FIG. 7.

FIG. 16, where like parts have been given like numbers, shows a flowchart of one example of one or more of control loop engines 90b, 90c, ... 90n, FIG. 7 that by be used by shunt converter 22, FIG. 1, to select hard state machine 330, FIG. 16, associated with hard threshold 300, FIG. 13, and A-306, high state machine 332, FIG. 16, associated with high threshold 302, FIG. 13, and B-312, or normal or low state machine 334, FIG. 16, associated low threshold 304, FIG. 13, and D-310 that adjusts loop gain $K_2$,-98, FIG. 7, for the VAR regulation function and loop gain $K_3$-98 for current harmonic mitigation functions. In this example, VAR regulation and current harmonic mitigation have been assigned the same priority as shown in Table 2 above, so $K_2$ and $K_3$ are both adjusted in parallel.

Table 3 below shows examples of the threshold values shown in FIG. 13 that may be used for RMS current ($I_{RMS}$) 12 and peak current Ipeak 14 in shunt converter 22. Unlike series converter 34, the thresholds in shunt converter 22 are preferably static for RMS current 12 and peak current 14, but they may be dynamic.

TABLE 3

Shunt Converter Thresholds

| Threshold | $I_{rms}$ | $I_{peak}$ |
|---|---|---|
| Hard | $I_{rms-A}$ | $I_{peak-A}$ |
| High | $I_{rms-B}$ | $I_{peak-B}$ |
| Low | $I_{rms-D}$ | $I_{peak-D}$ |

Figure 17:
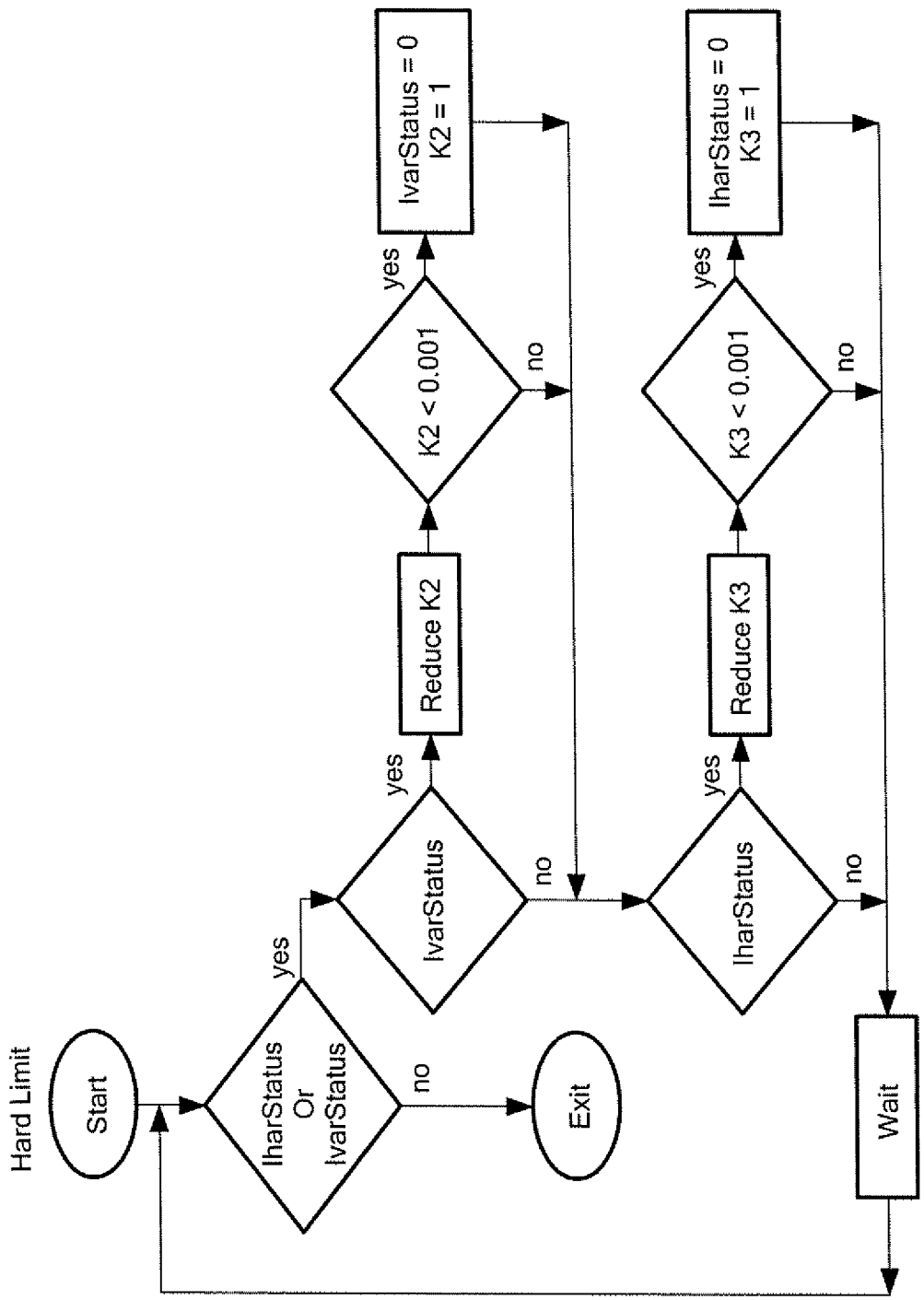
FIG. 17 is a flowchart showing an example of the hard limit state machine that may be used to provide a controlled rapid ramp down of the gain parameters $K_2$ and $K_3$ shown in FIG. 7.
Figure 18:
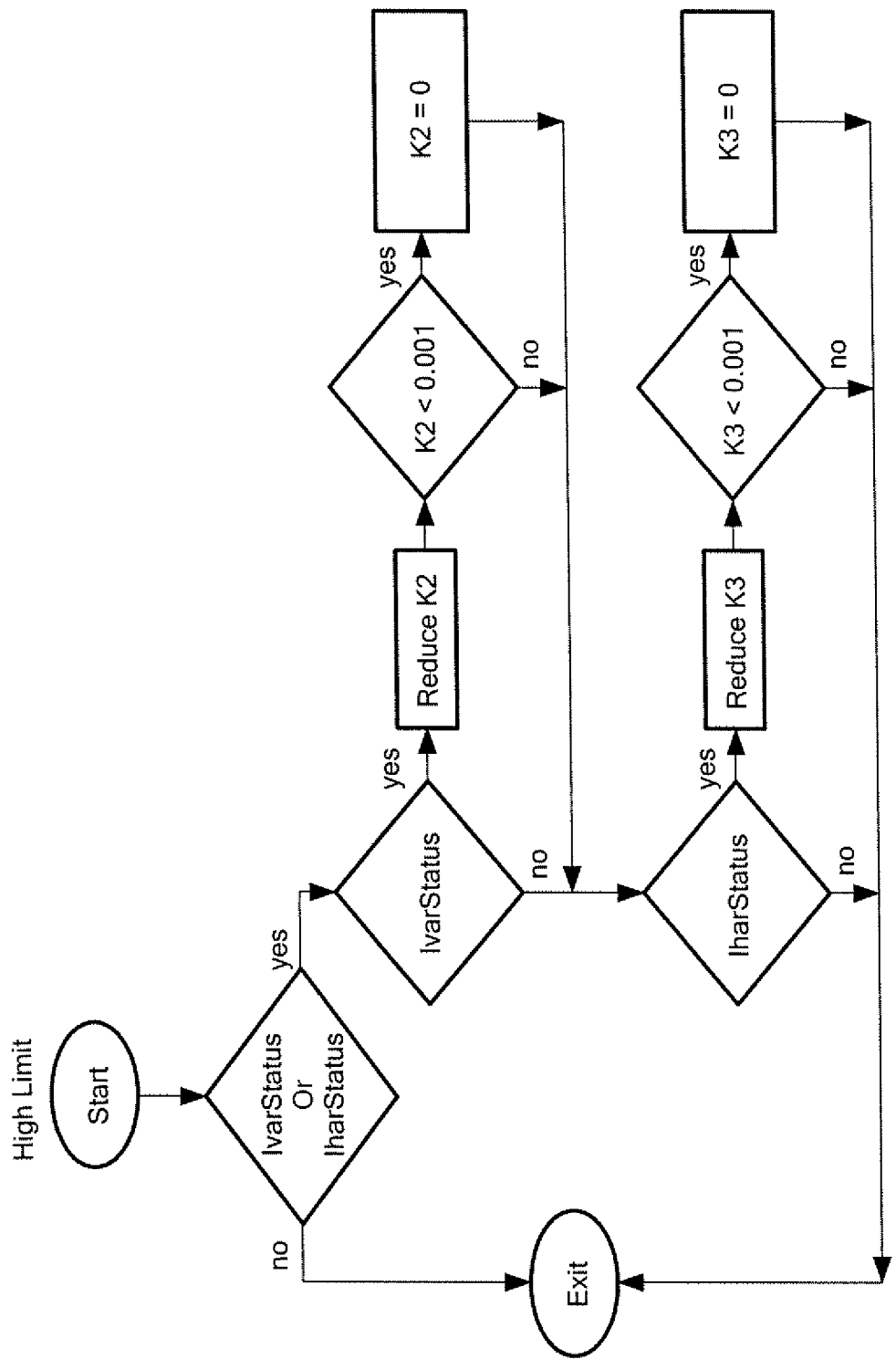
FIG. 18 shows an example of the soft limit state machine that may be used to adjust the reduce the loop gain $K_2$ and $K_3$ shown in FIG. 7.
Figure 19:
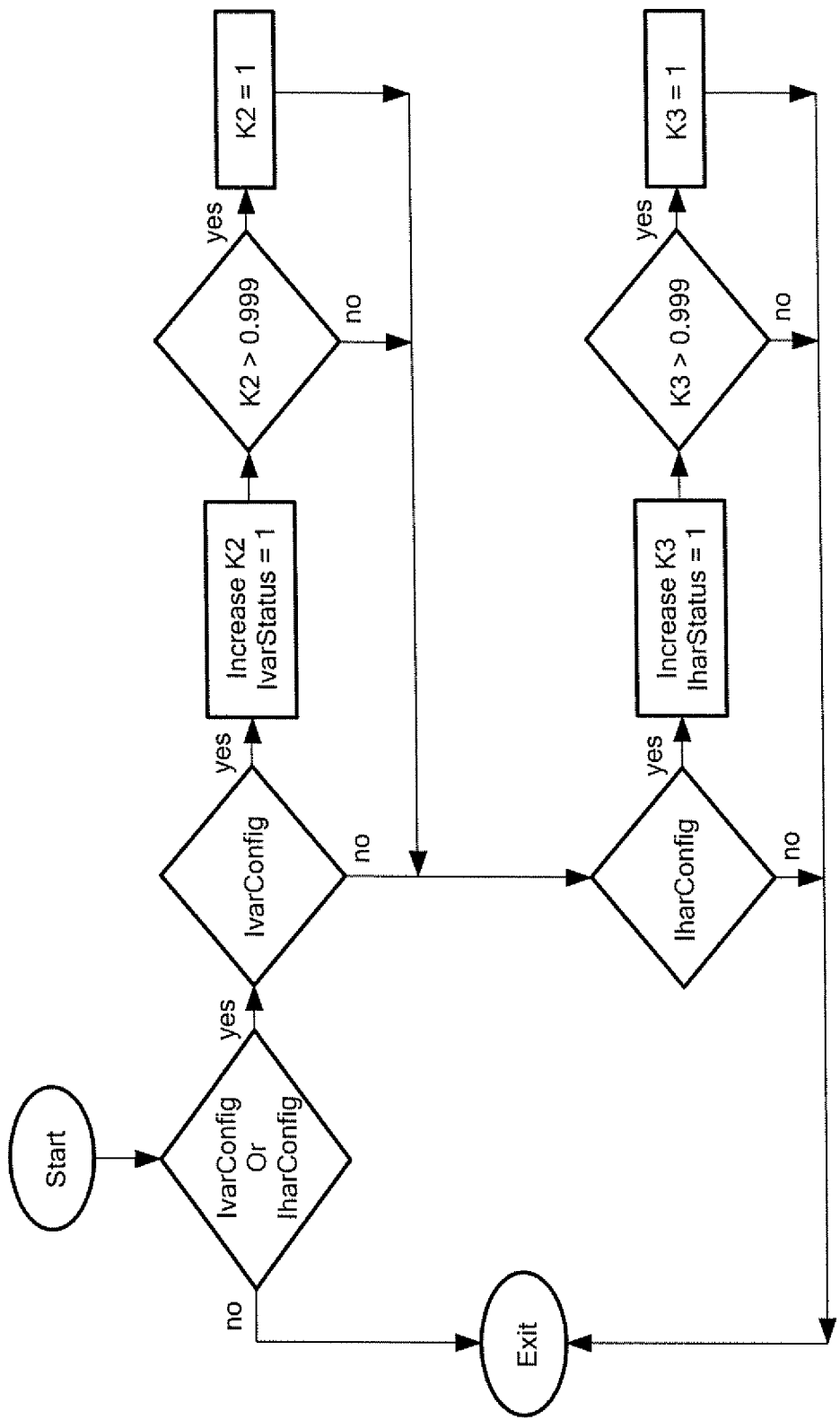
FIG. 19 shows one example of a normal state machine that would normally be executing when the loop gain $K_2$ and $K_3$ shown in FIG. 7 is adjusted such that resource consumption is within the resource capacity limits of the resources.

FIGS. 17, 18, and 19 show examples of flowcharts of one example of state machines which may be used by shunt converter 22 to adjust $K_2$-98 and $K_3$-98, FIG. 7. The logic is essentially the same as series converter 34 discussed above with reference to FIGS. 14-16 with the exception that both VAR regulation and current harmonic mitigation are both being modified in parallel due to both functions having the same priority.

For enablement purposes only, the computer program listing appendix provided can be executed on a processor or computer to carry out the primary steps and/or functions of a multi-function power regulator 10 discussed above with reference to one or more of FIGS. 1-19 and recited in the claims hereof. Other equivalent algorithms and code can be designed by a software engineer and/or programmer skilled in the art using the information provided herein.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A multi-function power regulator for prioritizing functions and allocating resources thereof, the multi-function regulator comprising:
   a plurality of resources each having a resource capacity limit;
   a shunt converter configured to perform one or more shunt converter functions while consuming one or more of the resources;
   a series converter configured to perform one or more series converter functions while consuming one or more of the resources;
   a control engine coupled to the shunt converter, the series converter, and a plurality of sensors, the control engine configured to monitor and control the one or more shunt converter functions and the one or more series converter functions; and
   a priority control engine coupled to the control engine, the priority control engine configured to set a priority order for performing the one or more shunt converter functions and/or the one or more series converter functions and configured to determine whether one or more resource capacity limits has been exceeded or not exceeded by the shunt converter functions and/or the series converter function and in response to one or more exceeded resource capacity limits adjust the operation of the shunt converter functions and/or the series converter based on the priority order such that the one or more resource capacity limits exceeded is no longer exceeded.

2. The multi-function power regulator of claim 1 in which the one or more shunt converter functions include voltage regulation on the DC bus, VAR regulation, and current harmonic mitigation.

3. The multi-function power regulator of claim 1 in which the one or more series converter functions includes voltage regulation and voltage harmonic mitigation.

4. The multi-function power regulator of claim 1 further including one or more control loop engines each having a loop filter with a loop gain adjuster responsive to the priority control engine configured to change the loop gain of the control loop engine such that the one or more resources consumed by the shunt converter functions and/or the series converter functions is adjusted based on the priority order.

5. The multi-function power regulator of claim 4 in which one or more of the control loop engines is configured to reduce the loop gain of the control loop engine when one or more of the resource capacity limits is exceeded such that the one or more of the resources consumed by the shunt converter functions and/or the series converter functions is reduced based on the priority order.

6. The multi-function power regulator of claim 4 in which one or more of the control loop engines is configured to increase the loop gain of the control loop engine when the all resources consumed by the one or more shunt converter functions and/or the one or more series converter functions do not exceed the one or more resource capacity limits to allow the one or more of the resources consumed by the shunt converter functions and/or the series converter functions to increase based on the predetermined priority order.

7. The multi-function power regulator of claim 1 further including one or more control loop engines each associated with a predetermined voltage harmonic and each having a loop filter with a loop gain adjuster responsive to the priority control engine configured to change the loop gain of the control loop engine such that one or more of the resources consumed by voltage harmonic mitigation is adjusted based on the predetermined priority order.

8. The multi-function power regulator of claim 7 in which one or more of the control loop engines is configured to reduce the loop gain of the control loop engine when the one or more resource capacity limits is exceeded such that one or more of the resources consumed by voltage harmonic mitigation is reduced based on the predetermined priority order.

9. The multi-function power regulator of claim 7 in which one or more of the control loop engines is configured to increase the loop gain of the control loop engine when all resources consumed by voltage harmonic mitigation do not exceed the one or more resource capacity limits to allow one or more of the resources consumed by voltage harmonic mitigation to increase based on the predetermined priority order.

10. The multi-function power regulator of claim 1 further including one or more control loop engines each having a loop filter with a loop gain adjuster configured to change the loop gain of the control loop engine in response to the priority control engine such that one or more of the resources consumed by voltage-ampere reactive (VAR) regulation is adjusted based on the predetermined priority order.

11. The multi-function power regulator of claim 10 in which one or more of the control loop engines is configured to reduce the loop gain of the control loop engine when the one or more resource capacity limits is exceeded such that one or more of the resources consumed by VAR regulation is reduced based on the predetermined priority order.

12. The multi-function power regulator of claim 10 in which one or more of the control loop engines is configured to increase the loop gain of the control loop engine when all resources consumed by VAR regulation do not exceed the one or more resource capacity limits to allow the one or more the resources consumed VAR regulation to increase based on the predetermined priority order.

13. The multi-function power regulator of claim 1 further including one or more control loop engines each associated with a predetermined current harmonic and each having a loop filter with a loop gain adjuster responsive to the priority control engine configured to change the loop gain of the control loop engine such that one or more of the resources consumed by current harmonics mitigation is adjusted based on the predetermined priority order.

14. The multi-function power regulator of claim 13 in which one or more of the control loop engines is configured to reduce the loop gain of the control loop engine when the one or more resource capacity limits is exceeded such that the one or more of the resources consumed by current harmonics mitigation is reduced based on the predetermined priority order.

15. The multi-function power regulator of claim 13 in which one or more of the control loop engines is configured to increase the loop gain of the control loop engine when all resources consumed by current harmonic mitigation do not exceed the one or more resource capacity limits to allow one of more of the resources consumed by current harmonics mitigation to increase based on the predetermined priority order.

16. The multi-function power regulator of claim 1 further including one or more control loop engines each having a reference adjuster responsive to the priority control engine configured to change a reference for the control loop engine such that the resources consumed by the shunt converter functions and/or the series converter functions is adjusted based on the predetermined priority order.

17. The multi-function power regulator of claim 16 in which the one or more of the control loop engines is configured to reduce difference between the reference and an input such that the resources consumed by the shunt converter functions and/or the series converter functions is reduced based on the predetermined priority order.

18. The multi-function power regulator of claim 16 in which the one or more of the control loop engines is configured to reduce difference between the reference and a reference set point when all resources consumed by the one or more shunt converter functions and/or one or more series converter functions do not exceed the one or more resource capacity limits to allow one or more of the resources consumed by the shunt converter functions and/or the series converter functions to increase based on the predetermined priority order.

19. The multi-function power regulator of claim 1 further including one or more control loop engines each associated with a predetermined voltage harmonic and each having a reference adjuster responsive to the priority control engine configured to change a reference for the control loop engine such that the resources consumed by the voltage harmonic mitigation is adjusted based on the predetermined priority order.

20. The multi-function power regulator of claim 19 in which the one or more of the control loop engines is configured to reduce difference between the reference and an input such that the resources consumed voltage harmonic mitigation is reduced based on the predetermined priority order.

21. The multi-function power regulator of claim 19 in which the one or more of the control loop engines is configured to reduce difference between the reference and a reference set point when all resources consumed by voltage harmonic mitigation do not exceed the one or more resource capacity limits to allow one or more of the resources consumed by voltage harmonic mitigation to increase based on the predetermined priority order.

22. The multi-function power regulator of claim 1 further including one or more control loop engines each having a reference adjuster responsive to the priority control engine configured to change a reference for the control loop engine such that the resources consumed by voltage-ampere reactive (VAR) regulation is adjusted based on the predetermined priority order.

23. The multi-function power regulator of claim 22 in which the one or more of the control loop engines is configured to reduce difference between the reference and an input such that the resources consumed by VAR regulation is reduced based on the predetermined priority order.

24. The multi-function power regulator of claim 22 in which the one or more of the control loop engines is configured to reduce difference between the reference and a reference set point when all resources consumed by VAR regulation do not exceed the one or more resource capacity limits to allow one or more of the resources consumed by VAR regulation to increase based on the predetermined priority order.

25. The multi-function power regulator of claim 1 further including one or more control loop engines each associated with a predetermined current harmonic and each having a reference adjuster responsive to the priority control engine configured to change a reference for the control loop engine such that the resources consumed by current harmonic mitigation is adjusted based on the predetermined priority order.

26. The multi-function power regulator of claim 25 in which the one or more of the control loop engines is configured to reduce difference between the reference and an input such that the resources consumed by current harmonic mitigation is reduced based on the predetermined priority order.

27. The multi-function power regulator of claim 25 in which the one or more of the control loop engines is configured to reduce difference between the reference and a reference set point when all resources consumed by current harmonic mitigation do not exceed the one or more resource capacity limits to allow one or more of the resources consumed current harmonic mitigation to increase based on the predetermined priority order.

28. The multi-function power regulator of claim 1 in which the one or more resources include RMS voltage, RMS current, peak current, and power.

29. The multi-function power regulator of claim 1 in which the priority control engine is configured to assign each of the shunt converter functions and the series converter function a priority.

30. A multi-function power regulator for prioritizing functions and allocating resources thereof, the multi-function regulator comprising:
at least shunt converter and a series converter each configured to consume one or more resources each having a resource capacity limit while performing one or more shunt converter functions and/or one or more series converter functions; and
a priority control engine configured to set a priority order for performing the shunt converter functions and/or the series converter functions and configured to determine whether one or more resource capacity limits has been exceeded or not exceeded by the shunt converter functions and/or the series converter function and in response to one or more exceeded resource capacity limits adjust the operation of the shunt converter functions and/or the series converter based on the priority order such that the one or more resource capacity limits exceeded is no longer exceeded.

31. A method for prioritizing and allocating resources of a multi-function power regulator, the method comprising:
monitoring and controlling one or more shunt converter functions and series converter functions each configured to consume one or more resources each having a resource capacity limit;
setting a priority order for performing the shunt converter functions and/or the series converter functions;
determining whether one or more of the resource capacity limits has been exceeded or not exceeded by the shunt converter functions and/or the series converter functions; and
in response to one or more exceeded resource capacity limits, adjust the operation of the shunt converter functions and/or the series converter functions based on the priority order such that the one or more resource capacity limits is no longer exceeded.

32. The method of claim 31 further including the step of providing one or more control loop engines each having a loop filter with a gain adjuster.

33. The method of claim 32 further including changing the loop gain of the control engine such that one or more resources consumed by the shunt converter functions and the series converter functions is adjusted based on the priority order.

34. The method of claim 33 further including reducing the loop gain of the control engine when one or more of the resource capacity limits is exceeded such that one or more of the resources consumed by the shunt converter functions and/or the series converter functions is reduced based on the priority order.

35. The method of claim 33 further including increasing the loop gain of the control engine when all resources consumed by the one or more shunt converter functions and/or the series converter functions do not exceed the one or more resource capacity limits to allow one or more of the resources consumed by the shunt converter functions and/or the series converter functions to increase based on the predetermined priority order.

36. The method of claim 31 further including providing one or more control loop engines each having a reference adjuster.

37. The method of claim 36 further including changing a reference for the control engine such that all resources consumed by the shunt converter functions and/or the series converter functions is adjusted based on the predetermined priority order.

38. The method of claim 37 further including reducing the difference between a reference and an input such that all resources consumed by the shunt converter functions and/or the series converter functions is reduced based on the predetermined priority order.

39. The method of claim 37 further including reducing the difference between the reference and a reference set point when all resources consumed by the one or more shunt converter functions and/or the one or more series converter functions do not exceed the one or more resource capacity limits to allow one or more resources consumed by the shunt converter functions and/or the series converter functions increase based on the predetermined priority order.

* * * * *